United States Patent
Bageshwar et al.

(10) Patent No.: US 9,037,411 B2
(45) Date of Patent: May 19, 2015

(54) SYSTEMS AND METHODS FOR LANDMARK SELECTION FOR NAVIGATION

(75) Inventors: Vibhor L. Bageshwar, Minneapolis, MN (US); Yunqian Ma, Plymouth, MN (US); Shrikant Rao, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 267 days.

(21) Appl. No.: 13/469,356

(22) Filed: May 11, 2012

(65) Prior Publication Data
US 2013/0304383 A1 Nov. 14, 2013

(51) Int. Cl.
G08G 1/123 (2006.01)
G01C 21/10 (2006.01)
G01C 17/38 (2006.01)
G01C 21/16 (2006.01)
G01C 21/20 (2006.01)

(52) U.S. Cl.
CPC .............. *G01C 17/38* (2013.01); *G01C 21/165* (2013.01); *G01C 21/20* (2013.01)

(58) Field of Classification Search
USPC ......... 701/400, 408, 426, 480, 500, 532–534, 701/538, 540
See application file for complete search history.

(56) References Cited

U.S. PATENT DOCUMENTS

| | | | |
|---|---|---|---|
| 6,055,477 A | 4/2000 | McBurney et al. | |
| 6,324,469 B1 * | 11/2001 | Okude et al. | 701/532 |
| 8,174,568 B2 * | 5/2012 | Samarasekera et al. | 348/113 |
| 8,195,386 B2 * | 6/2012 | Hu et al. | 701/436 |
| 2004/0073360 A1 * | 4/2004 | Foxlin | 701/207 |
| 2004/0168148 A1 * | 8/2004 | Goncalves et al. | 717/104 |
| 2008/0167814 A1 | 7/2008 | Samarasekera et al. | |
| 2009/0125234 A1 * | 5/2009 | Geelen et al. | 701/209 |
| 2009/0248304 A1 | 10/2009 | Roumeliotis et al. | |
| 2010/0070162 A1 * | 3/2010 | Aihara | 701/201 |

(Continued)

FOREIGN PATENT DOCUMENTS

EP 2246763 11/2010

OTHER PUBLICATIONS

Massatt et al., "Geometric Formulas for Dilution of Precision Calculations", "Journal of the Institute of Navigation", Jun. 1990, pp. 379-391, vol. 37, No. 4.

(Continued)

*Primary Examiner* — James Trammell
*Assistant Examiner* — Majdi Alsomiri
(74) *Attorney, Agent, or Firm* — Fogg & Powers LLC

(57) ABSTRACT

Systems and methods are provided for selecting landmarks for navigation. In one embodiment, a system comprises an IMU that provides inertial measurements for a vehicle and at least one image sensor that acquires measurements of the vehicle's environment. The system also comprises a processing unit that calculates a navigation solution for the vehicle based on the inertial measurements, identifies a plurality of landmarks in the acquired measurements, and identifies a plurality of usable landmarks from the plurality of landmarks. The processing unit also selects a subset of useable landmarks from the plurality of useable landmarks such that the subset of landmarks has a smaller dilution of precision (DOP) than other possible subsets of landmarks from the plurality of useable landmarks, and calculates an updated navigation solution from the subset of landmarks. The DOP is an amplification factor of measurement errors derived from the geometry of the subset of useable landmarks.

20 Claims, 6 Drawing Sheets

(56) References Cited

U.S. PATENT DOCUMENTS

| | | |
|---|---|---|
| 2010/0106356 A1 | 4/2010 | Trepagnier et al. |
| 2010/0250116 A1* | 9/2010 | Yamaguchi et al. .......... 701/201 |
| 2010/0256900 A1* | 10/2010 | Yamaguchi et al. .......... 701/201 |
| 2011/0098910 A1* | 4/2011 | Saarimaki et al. ............ 701/200 |
| 2011/0130949 A1* | 6/2011 | Arrasvuori .................... 701/200 |
| 2011/0153072 A1* | 6/2011 | Anderson ..................... 700/245 |
| 2011/0218733 A1* | 9/2011 | Hamza et al. ................. 701/213 |

OTHER PUBLICATIONS

European Patent Office, "European Search Report from EP Application No. 13163947.8 mailed on Jan. 20, 2014", "from Foreign Counterpart of U.S. Appl. No. 13/469,356", Jan. 20, 2014, pp. 1-3, Published in: EP.

Kelly, "Precision Dilution in Triangulation Based Mobile Robot Position Estimation", "Intelligent Autonomous Systems", Jan. 1, 2003, pp. 18.

* cited by examiner

SYSTEMS AND METHODS FOR LANDMARK SELECTION FOR NAVIGATION

BACKGROUND

Vision based navigation systems are typically affixed to a vehicle and can perform two tasks. First, the vision based navigation system can generate a map of the vehicle's operating environment using landmarks within the operating environment. Second, the vision based navigation system can estimate the vehicle's navigation solution relative to the landmarks in the map as the vehicle operates in the environment. The vehicle's navigation solution can be defined by specifying the relative position, velocity, and three-dimensional angular orientation of two reference frames.

The number of landmarks that can be used to build the map and calculate the vehicle's navigation solution is limited to the number of landmarks that can be identified from a sensor measurement. Further, as the vehicle moves in its operating environment, the sensor affixed to the vehicle will have a different view of the local environment providing the vision based navigation system with different line of sight vectors to landmarks to calculate the navigation solution. However, as the vehicle moves, the number of useable landmarks identified in the sensor measurements and used to calculate the navigation solution can grow very large. In some real-time applications, the vehicle lacks the onboard computational capability to use an arbitrary number of landmark measurements when calculating the navigation solution using the vision based navigation system. These computational constraints effectively limit the number of landmarks that can be used to build the map and compute the vehicle's navigation solution relative to the map.

SUMMARY

The embodiments of the present disclosure provide systems and methods for landmark selection for navigation and will be understood by reading and studying the following specification.

Embodiments described herein provide improved systems and methods for selecting landmarks for navigation. In one embodiment, a system comprises an inertial measurement unit configured to provide inertial measurements for a vehicle and at least one image sensor configured to acquire measurements of the environment of the vehicle. The system also comprises one or more processing units configured to calculate a navigation solution for the vehicle based on the inertial measurements, identify a plurality of landmarks in the acquired measurements, and identify a plurality of useable landmarks from the plurality of landmarks. The one or more processing units is also configured to select a subset of useable landmarks from the plurality of useable landmarks such that the subset of landmarks has a smaller dilution of precision than other possible subsets of landmarks from the plurality of useable landmarks. Further, the one or more processing units is configured to calculate an updated navigation solution based on the subset of landmarks. The dilution of precision is an amplification factor of measurement errors derived from the geometry of the subset of useable landmarks.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
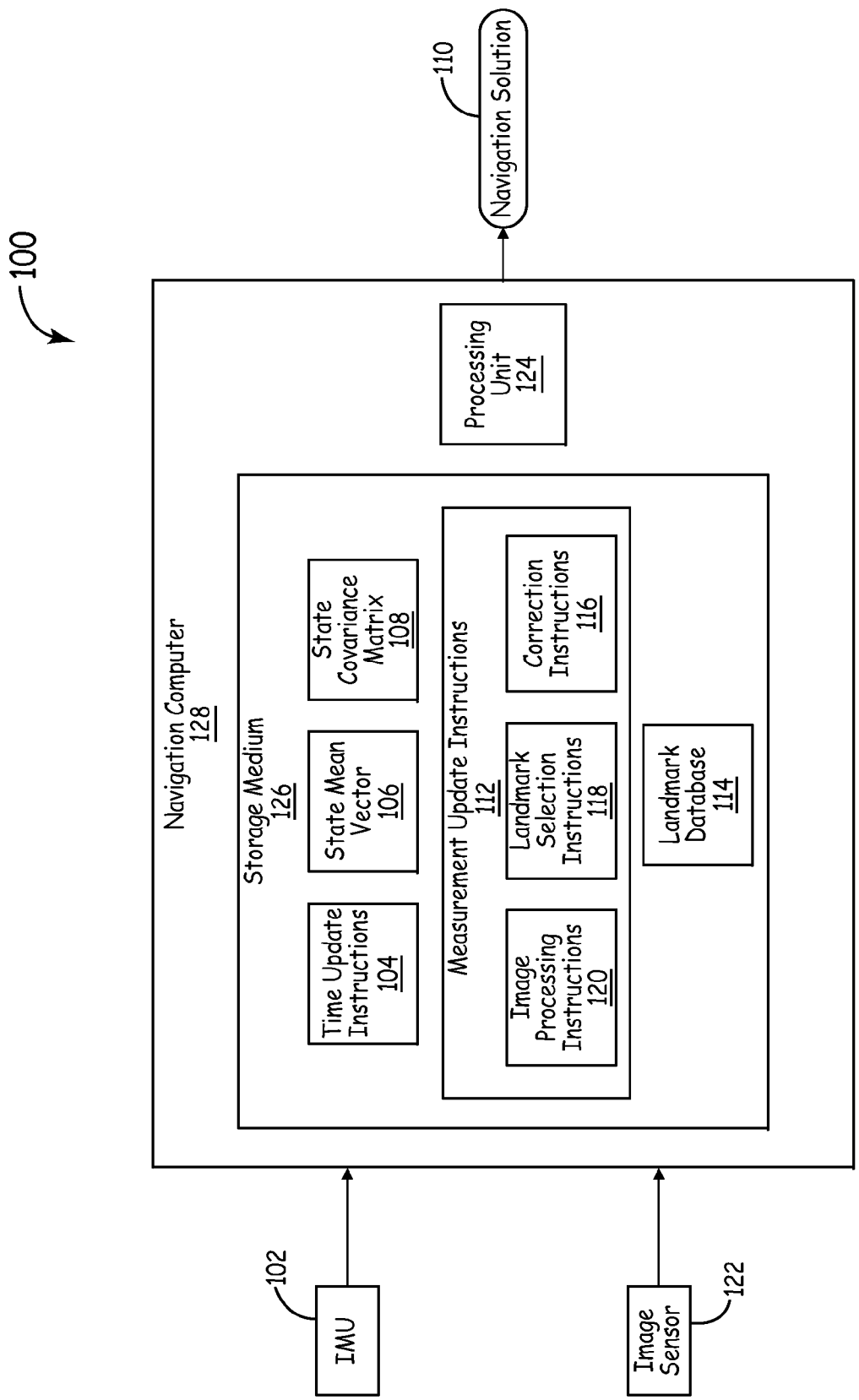
FIG. 1 is a block diagram of a vision based navigation system according to one embodiment.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustrating specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

A vehicle's navigation solution can be defined by specifying the relative position vector, velocity vector, and three-dimensional angular orientation of one reference frame relative to a second reference frame. The first frame is typically a vehicle fixed frame and the second frame is typically a navigation frame. The relative position vector, velocity vector, and three-dimensional angular orientation are referred to as a kinematic state vector. The error of the vehicle's kinematic state vector estimated by the navigation system depends on a number of factors that include the measurement errors of the vision based sensors and the geometry of the useable landmark positions.

The measurement errors of a sensor measurement are governed by the sensor type and sensor grade. The geometry of the useable landmark positions refers to the position of landmarks with respect to the vehicle; the effect of the landmark position geometry on the error introduced by the vision sensors can be quantified through a metric referred to as the Dilution of Precision (DOP). As used herein, a DOP is a scalar amplification factor of the sensor measurement errors and, thus, a large DOP adversely affects the accuracy of the vehicle's navigation solution. As described in this application, a vision based navigation system selects a subset of useable landmarks to compute a navigation solution based on the useable landmark geometry to limit the computational load of processing the landmarks. Further, the subset of useable landmarks is selected to limit the DOP (For example, the subset of useable landmarks is selected such that the DOP is minimized).

FIG. 1 is a block diagram of a vision based navigation system 100. In certain embodiments, the vision based navigation system 100 generates a map of a vehicle's operating environment using landmarks within the vehicle's environment. Also, the vision based navigation system 100 estimates the vehicle's navigation solution 110 relative to the landmarks in the map as the vehicle operates in the environment. As described above, the vehicle's navigation solution 110 specifies the relative position, velocity, and three-dimensional angular orientation of two reference frames. Alternatively, in other examples, the navigation solution 110 specifies a subset of the relative position, velocity, and three-dimensional angular orientation of two reference frames. To aid in generating the map and computing the navigation solution 110, the vision based navigation system 100 includes an inertial measurement unit (IMU) 102. The IMU 102 is a sensor device configured to sense motion and to output data corresponding to the sensed motion. In one embodiment, the IMU 102 comprises a set of 3-axis gyroscopes and 3-axis accelerometers that measure vehicle motion in any of six degrees of freedom (that is, rotation about three perpendicular axes and specific force in three perpendicular axes).

The vision based navigation system 100 further includes a navigation computer 128 that receives measurements from the IMU 102 and uses the measurements to determine the navigation solution 110. The navigation computer 128 includes one or more processing units 124 that process instructions and data received from external sensors to determine the navigation solution 110. In at least one embodiment, the navigation computer 128 includes a storage medium 126 for storing instructions processed by the processing unit 124 and data created during the processing of navigation data. The storage medium 126 comprises, in one implementation, a tangible medium for storing machine readable data.

In certain embodiments, the storage medium 126 includes time update instructions 104. The time update instructions 104, when processed by the processing unit 124, are part of a Kalman filter for estimating navigation solutions. When the processing unit 124 executes the time update instructions 104, the processing unit 124 receives sensor output from the IMU 102 and uses the output from the IMU 102 to predict a navigation solution 110 using the posterior estimate of the navigation solution 110.

The storage medium 126 can also include measurement update instructions 112. The measurement update instructions 112, when processed by the processing unit 124, use the measurements from the image sensor 122 to correct the navigation solution predicted using the measurements from the IMU 102. The corrected, or posterior navigation solution 110 is referred to herein as the "updated navigation solution". In some examples, additional measurements from sources other than the image sensor 122 can also be used to calculate the updated navigation solution. In certain implementations, the processing unit 124 stores the predicted and updated navigation solutions 110 in the storage medium 126. For example, the storage medium 126 stores a state mean vector 106 that includes the predicted and updated navigation solutions. Also, the storage medium 126 stores a state covariance matrix 108 that includes the variances of the predicted and updated navigation solution 110. The processing of the measurement update instructions 112 and the time update instructions 104 by the processing unit 124 helps to provide a more accurate estimated navigation solution 110 for the vehicle using the vision based navigation system 100.

When processing unit 124 processes the measurement update instructions 112, the processing unit 124 uses the predicted navigation solution 110 in a feedback loop in conjunction with measurements received from sensors other than the IMU 102 to update the predicted navigation solution 110. In one embodiment, to receive measurements from sensors other than the IMU 102, the navigation computer 128 receives data from an image sensor 122. Alternatively, the navigation computer 128 receives data from multiple image sensors 122. The term "image sensor" refers to a sensor that is capable of gathering quantifiable information about the environment of the vision based navigation system 100. For example, the image sensor 122 includes LiDARs, vision cameras, infrared cameras, and the like. The image sensor 122 gathers two-dimensional or three-dimensional measurements of the environment of the vision based navigation system 100. In the scope of a Kalman filter, the IMU measurements are used to predict the navigation solution 110 of the vehicle and the navigation computer 128 uses the measurements from the image sensor 122 to update the predicted navigation solution 110 based on measurements of the vehicle's environment, where the updates correct errors that arise during the prediction of the navigation solution 110 computed using measurements from the IMU 102. To calculate the correction for the predicted navigation solution based on measurements from the IMU 102, the processing unit 124 executes measurement update instructions 112.

In at least one embodiment, the measurement update instructions 112 include image processing instructions 120. The image processing instructions 120 direct the processing unit 124 to process data received from the image sensor 122 to identify landmarks in the environment of the vision based navigation system 100. As used herein, the phrase "identified landmarks" refers to landmarks identified in environmental measurements taken by the image sensor 122. Further, the image processing instructions 120 instruct the processing unit 124 to attempt to match the identified landmarks in recently acquired sensor data with landmarks that have been previously identified. Landmarks that have been identified in data acquired from the image sensor 122 and matched with previously acquired sensor data are delimited as useable landmarks. The difference in the line of sight vector from the sensor to the useable landmarks in a first set of data acquired from the image sensor 122 and a second set of data acquired from the image sensor 122 at a previous time aids in correcting the navigation solution 110. However, the ability of the Kalman filter to use the useable landmarks identified in the image data acquired from the image sensor 122 to correct the errors of the navigation solution predicted using measurements from the IMU 102 are affected by the measurement errors of the image sensor 122 and the geometry of the useable landmark positions relative to the vehicle.

In at least one implementation, the measurement errors of the image sensor 122 are caused by the sensor type, sensor quality, and sensor noise characteristics. The geometry of the useable landmarks relative to the vehicle influences the magnitude to which the sensor measurement errors affect the correction of the navigation solution 110. The magnitude to which the measurement errors affect the updated navigation solution 110 can be quantified as an amplification factor of the sensor measurement errors. The amplification factor is known as the dilution of precision (DOP), which is derived from the geometry of the identified landmarks in the measurements of the image sensor 122. The measurement errors are calculated using the equation $\delta m = H \delta P$, where $\delta m$ is the measurement error, H is a geometry matrix that includes information about the position of the useable landmarks relative to the vehicle, and $\delta P$ is the position error of the navigation solution 110 computed by the vision based navigation system 100. The following equations illustrate how the geometry formed by the position of the useable landmarks relative to the vehicle affects the position errors:

$$\delta m = H\delta P$$

$$H^T \delta m = H^T H \delta P$$

$$\delta P = (H^T H)^{-1} H^T \delta m$$

$$E\{\delta P \delta P^T\} = E\{[(H^T H)^{-1} H^T \delta m][(H^T H)^{-1} H^T \delta m]^T\}$$
$$= (H^T H)^{-1} H^T E\{\delta m \delta m^T\} H (H^T H)^{-T}.$$

As illustrated in the above equations, the term $(H^T H)^{-1}$ is a matrix that includes the effect of the useable landmark geometry on the vehicle navigation solution estimation error. As the DOP is a scalar amplification factor of the measurement error, the DOP can be written as follows:

$$\mathrm{DOP} = f[(H^T H)^{-1}].$$

In certain embodiments, the vision based navigation system 100 operates in real time. During the operation of the vision based navigation system 100, the data provided by the image sensor 122 includes more useable landmarks than the processing unit 124 can process in a given period of time. To use the landmarks identified in the data from the image sensor 122 for correcting the predicted navigation solution 110, the measurement update instructions 112 include landmark selection instructions 118. The landmark selection instructions 118 direct the processing unit 124 to select a subset of the useable landmarks that provides the smallest DOP from the possible subsets of the useable landmarks. In an example, the number of landmarks to include in the subset is based on the processing capability of the one or more processing units 124. In particular, if the processing unit 124 is only able to process the data associated with ten useable landmarks, and the processing unit 124, executing the image processing instructions 120, identifies twenty useable landmarks in the data provided by the image sensor 122, the landmark selection instructions 118 will direct the processing unit 124 to select the combination of ten useable landmarks from the twenty identified useable landmarks that provides the smallest DOP.

In certain embodiments, measurement update instructions 112 include correction instructions 116. The correction instructions 116 direct the processing unit 124 to calculate updates for the predicted navigation solution based on the subset of useable landmarks identified during the execution of the landmark selection instructions 118. For example, the correction instructions 116 direct the processing unit 124 to calculate the difference in the line of sight and position vectors between the subset of useable landmarks and corresponding useable landmarks identified from previous data received from the image sensor 122. The processing unit 124, executing the correction instructions 116, uses the calculated position differences between the subset of useable landmarks and stored useable landmarks to determine the motion of a vehicle containing the vision based navigation system 100. The measurement update instructions 112 instruct the processing unit 124 to use the motion information to update the predicted navigation solution 110 based on measurements from the IMU 102.

In at least one embodiment, the vision based navigation system 100 includes a landmark database 114 that stores the landmarks that have been identified during the execution of the measurement update instructions 112. In one implementation, the landmark database 114 stores the useable landmarks that have been identified in consecutive measurements by the image sensor 122. In an alternative implementation, the processing unit 124, during the execution of image processing instructions 120, stores all the landmarks identified in a measurement by the image sensor 122 in the landmark database 114. Further, landmark database 114 stores the subset of useable landmarks selected during the execution of landmark selection instructions 118. Processing unit 124 accesses landmark database 114 to acquire information about useable landmarks that have been previously identified during the execution of measurement update instructions 112.

Figure 2:
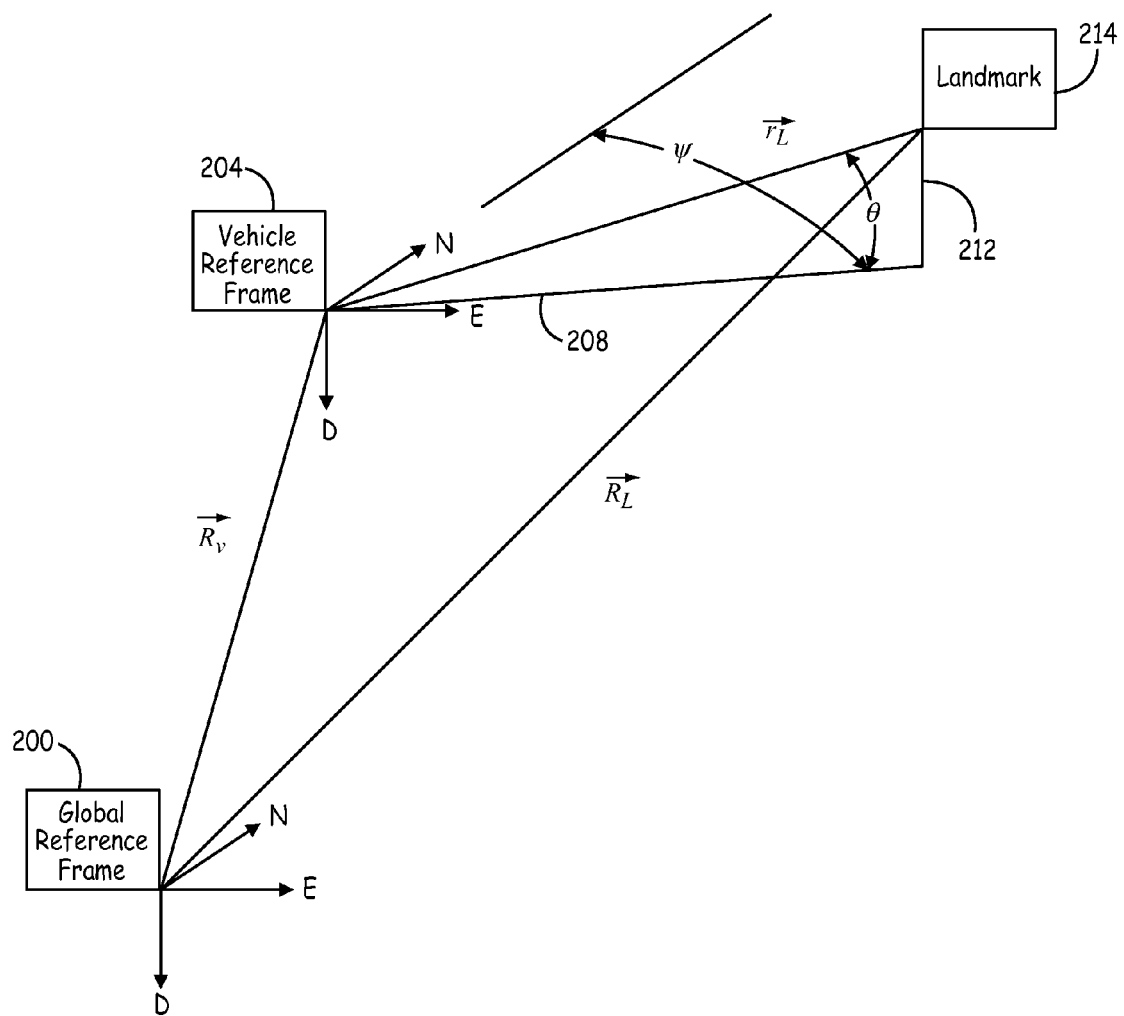
FIG. 2 is a diagram illustrating relationships between reference frames used in a vision based navigation system according to one embodiment.

FIG. 2 is a diagram illustrating relationships between vehicle and landmark reference frames used in vision based navigation system 100 in FIG. 1. The changes in the line of sight vector of useable landmarks relative to the vehicle between different image frames help determine the position, velocity, and three-dimensional angular orientation of a vehicle reference frame 204 relative to a global reference frame 202. The different reference frames illustrated in FIG. 2 include a global reference frame 200 and a vehicle reference frame 204. The global reference frame 200 acts as a point of origin for the motion of a vision based navigation system 100. In certain embodiments, the vision based navigation system 100 establishes the origin of the global reference frame 200 at the location of a vehicle at the beginning of operation for the vision based navigation system 100. Alternatively, the global reference frame 200 can be a reference frame that is established at a location that is not tied to the position of the vehicle. In at least one implementation, the global reference frame 200 is established as a north east down (NED) reference frame. The down axis points toward the center of the earth from the origin of the global reference frame. The north axis is orthogonal to the down axis and points north toward the north pole within the tangent plane of the Earth's surface at the origin of the NED reference frame. The east axis is orthogonal to both the down and north axes and points in the east direction within the tangent plane of the Earth's surface at the origin of the NED reference frame.

The vision based navigation system calculates the position vector of a vehicle reference frame 204 in relation to the global reference frame 200. To calculate the position vector of the vehicle reference frame 204 relative to the global reference frame 200, the vision based navigation system 100 measures the position vector of the vehicle associated with vehicle reference frame 204 in relation to the location of a landmark 214 or multiple landmarks 214. As vehicle reference frame 204 moves, the vision based navigation system 100 calculates the position vector of a landmark 214 in relation to vehicle reference frame 204, calculates the position of the vehicle reference frame 204 relative to the global reference frame 200, and calculates the position vector of a landmark 214 relative to the global reference frame 200. The vision based navigation system 100 uses the position vector of the landmark 214 in relation to the global reference frame 200 to determine the location of the vehicle reference frame 204 in relation to the global reference frame 200.

In one exemplary embodiment, the position vector of the vehicle reference frame 204 in relation to the global reference frame 200 is described by a vehicle position vector R. Also, the position vector of the landmark 214 in relation to the global reference frame 200 is described by the landmark constant position vector $\vec{R}_L$. Further, the position vector of the landmark 214 in relation to the vehicle reference frame 204 is described by the landmark variable position vector $\vec{r}_L$. In at least one implementation, when the vehicle begins operating the vehicle reference frame 204 is located at the global reference frame 200. When the vehicle reference frame 204 is located at the global reference frame 200, the landmark variable position vector $\vec{r}_L$ and the landmark constant position vector $\vec{R}_L$ are identical while vehicle position vector $\vec{R}_V$ has a zero magnitude. As the vehicle begins moving, the vehicle position vector $\vec{R}_V$ changes and the landmark variable position vector $\vec{r}_L$ begins to change while the landmark constant position vector $\vec{R}_L$ remains constant (assuming the landmark 214 is not moving in relation to the global reference frame 200). During navigation, the vision based navigation system 100 determines the landmark variable position vector $\vec{r}_L$. In certain implementations, the vision based navigation system 100 calculates a landmark variable position vector $\vec{r}_L$ by computing the angle ψ, where ψ is the heading angle of the landmark variable position vector $\vec{r}_L$ in relation to the north axis in the north-east axes plane of the vehicle reference frame 204. The vision based navigation system 100 also determines the angle θ, where θ is the elevation angle of the landmark variable position vector $\vec{r}_L$ from the north-east axes plane of the vehicle reference frame 204. Using both ψ and θ, which are calculated based on measurements from image sensor 122 attached to the vehicle, the vision based navigation system 100 calculates the landmark variable position vector $\vec{r}_L$. Having calculated the landmark variable position vector $\vec{r}_L$, the vision based navigation system 100 uses the landmark variable position vector $\vec{r}_L$ and the landmark constant position vector $\vec{R}_L$ to determine the vehicle position vector $\vec{R}_V$.

In at least one embodiment, to determine the subset of landmarks having the smallest DOP from a plurality of useable landmarks 214, the vision based navigation system 100 calculates the landmark variable position vector $\vec{r}_L$ for each useable landmark 214 of the plurality of useable landmarks 214. In at least one example, the vision based navigation system 100 solves for $\vec{r}_L$ using a direction cosine matrix as represented by the following:

$$r_L^{NED} = C_{NED \leftarrow s} \vec{r}_L^s$$
$$= C_{NED \leftarrow b} C_{b \leftarrow s} \vec{r}_L^s$$
$$= C_{NED \leftarrow b} \vec{r}_L^b$$

$$r_L^{NED} = \begin{bmatrix} \cos\theta\cos\psi & -\sin\psi & \sin\theta\cos\psi \\ \cos\theta\sin\psi & \cos\psi & \sin\theta\sin\psi \\ -\sin\theta & 0 & \cos\theta \end{bmatrix} \begin{bmatrix} r_L \\ 0 \\ 0 \end{bmatrix}$$

$$= r_L \begin{bmatrix} \cos\theta\cos\psi \\ \cos\theta\sin\psi \\ -\sin\theta \end{bmatrix}$$

where $C_{b \leftarrow NED}$ is equal to the following:

$$C_{b \leftarrow NED} = \begin{bmatrix} \cos\theta & 0 & -\sin\theta \\ 0 & 1 & 0 \\ \sin\theta & 0 & \cos\theta \end{bmatrix} \begin{bmatrix} \cos\psi & \sin\psi & 0 \\ -\sin\psi & \cos\psi & 0 \\ 0 & 0 & 1 \end{bmatrix}$$

$$= \begin{bmatrix} \cos\theta\cos\psi & \cos\theta\sin\psi & -\sin\theta \\ -\sin\psi & \cos\psi & 0 \\ \sin\theta\cos\psi & \sin\theta\sin\psi & \cos\theta \end{bmatrix}.$$

However, as stated above, the measurements taken by image sensor 122 in the vision based navigation system 100 are subject to various measurement errors. Further, image sensor 122 takes measurements of landmarks 214 in either three dimensions or two dimensions. When image sensor 122 gathers three-dimensional measurements, the magnitude of an estimated landmark variable position vector $\vec{r}_L$ for an ith landmark in the set of useable landmarks is given by the following equation:

$$r_{Li} = \|\vec{R}_V - \vec{R}_{Li}\|$$
$$= [(X_V - X_{Li})^2 + (Y_V - Y_{Li})^2 + (Z_V - Z_{Li})^2]^{1/2}.$$

Performing a first-order Taylor series expansion about both the estimated vehicle position and the estimated landmark position yields:

$$r_{Li} = \hat{r}_{Li} + \frac{\partial r_{Li}}{\partial X_V}\bigg|_{\hat{R}_{Li}^{NED}, \hat{R}_V^{NED}} \delta X_V + \frac{\partial r_{Li}}{\partial Y_V}\bigg|_{\hat{R}_{Li}^{NED}, \hat{R}_V^{NED}} \delta Y_V + \frac{\partial r_{Li}}{\partial Z_V}\bigg|_{\hat{R}_{Li}^{NED}, \hat{R}_V^{NED}} \delta Z_V + \ldots + \frac{\partial r_{Li}}{\partial X_{Li}}\bigg|_{\hat{R}_{Li}^{NED}, \hat{R}_V^{NED}} \delta X_{Li} + \frac{\partial r_{Li}}{\partial Y_{Li}}\bigg|_{\hat{R}_{Li}^{NED}, \hat{R}_V^{NED}} \delta Y_{Li} + \frac{\partial r_{Li}}{\partial Z_{Li}}\bigg|_{\hat{R}_{Li}^{NED}, \hat{R}_V^{NED}} \delta Z_{Li}.$$

Substituting for the Jacobian in the first-order Taylor series expansion, the error of the magnitude of the landmark variable position vector $\vec{r}_{Li}$ is given by the following:

$$r_{Li} - \hat{r}_{Li} = \frac{1}{2}\frac{1}{\hat{r}_{Li}}2(\hat{X}_V - \hat{X}_{Li})\delta X_V + \frac{1}{2}\frac{1}{\hat{r}_{Li}}2(\hat{Y}_V - \hat{Y}_{Li})\delta Y_V +$$
$$\frac{1}{2}\frac{1}{\hat{r}_{Li}}2(\hat{Z}_V - \hat{Z}_{Li})\delta Z_V + \ldots +$$
$$\frac{1}{2}\frac{1}{\hat{r}_{Li}}2(\hat{X}_V - \hat{X}_{Li})(-1)\delta X_{Li} + \frac{1}{2}\frac{1}{\hat{r}_{Li}}2(\hat{Y}_V - \hat{Y}_{Li})(-1)\delta Y_{Li} +$$
$$\frac{1}{2}\frac{1}{\hat{r}_{Li}}2(\hat{Z}_V - \hat{Z}_{Li})(-1)\delta Z_{Li}$$
$$= \begin{bmatrix} \frac{(\hat{X}_V - \hat{X}_{Li})}{\hat{r}_{Li}} & \frac{(\hat{Y}_V - \hat{Y}_{Li})}{\hat{r}_{Li}} & \frac{(\hat{Z}_V - \hat{Z}_{Li})}{\hat{r}_{Li}} \end{bmatrix} \begin{bmatrix} \delta X_V \\ \delta Y_V \\ \delta Z_V \end{bmatrix} + \ldots -$$
$$\begin{bmatrix} \frac{(\hat{X}_V - \hat{X}_{Li})}{\hat{r}_{Li}} & \frac{(\hat{Y}_V - \hat{Y}_{Li})}{\hat{r}_{Li}} & \frac{(\hat{Z}_V - \hat{Z}_{Li})}{\hat{r}_{Li}} \end{bmatrix} \begin{bmatrix} \delta X_{Li} \\ \delta Y_{Li} \\ \delta Z_{Li} \end{bmatrix};$$

$$\delta r_{Li} = H_{ri}\delta \vec{R}_V - H_{ri}\delta \vec{R}_{Li}.$$

Figure 3:
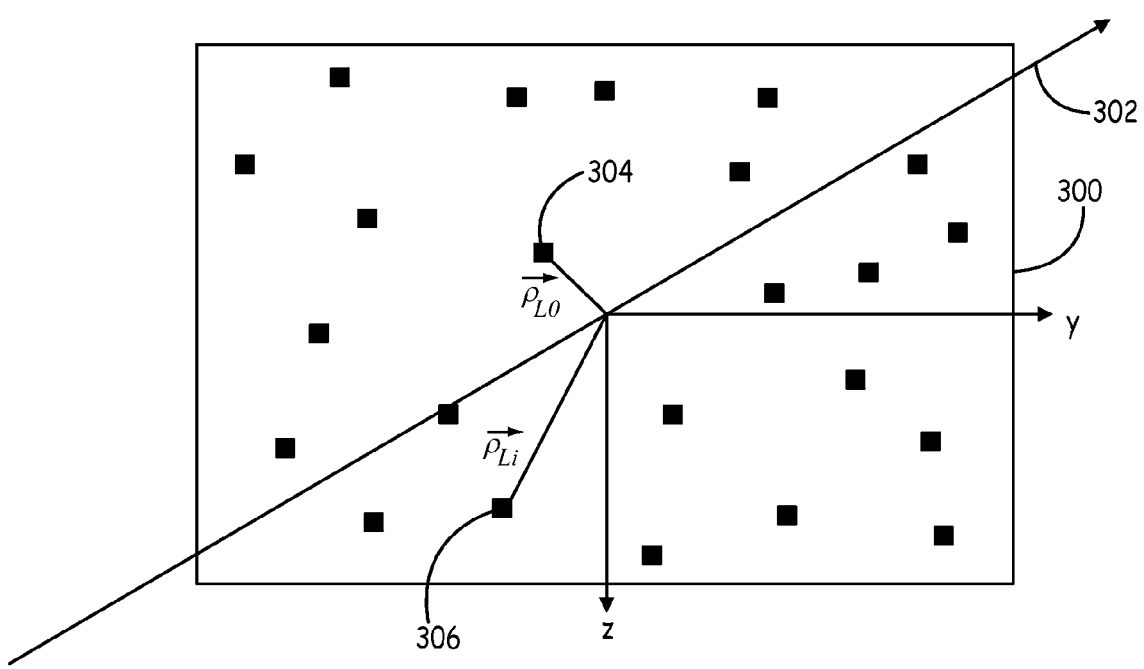
FIG. 3 is a diagram illustrating a two-dimensional sensor image depicting landmarks in relation to the sensor boresight vector according to one embodiment.

FIG. 3 is a diagram illustrating the measurement of landmarks in a two-dimensional frame 300 of image data. In a two-dimensional frame 300, the vision based navigation system 100 establishes a point within the frame 300 to act as a reference point for locating identified landmarks within the frame 300. For example, the vision based navigation system 100 identifies the location where the boresight 302 of the image sensor 122 intersects the frame 300. At the location where the boresight 302 intercepts the frame 300, the vision based navigation system 100 establishes the origin of a reference frame that has two axes in the plane of the frame 300.

When the reference frame axes are established, the vision based navigation system 100 identifies a landmark that is closest to the origin as the reference location 304 for the other landmarks in frame 300. The position of the reference location 304 in relation to the origin of the reference frame 300 is represented as reference vector $\overline{\rho}_{LO}$. Other identified landmarks 306 in frame 300 are also located in reference to the origin of the reference frame 300. For example, the position of an ith landmark 306 in relation to the origin of the reference frame 300 is represented as landmark vector $\overline{\rho}_{Li}$. The magnitude of the location of landmark 306 in relation to the reference location 304 is given by the following equation:

$$\rho_{Li} = [(y_{L0} - y_{Li})^2 + (z_{L0} - z_{Li})^2]_{1/2}.$$

Similar to the three-dimensional measurements, performing a first-order Taylor series expansion about both the estimated vehicle position and the estimated landmark position yields:

$$\rho_{Li} = \hat{\rho}_{Li} + \frac{\partial \rho_{Li}}{\partial y_{L0}}\bigg|_{\hat{r}_{Li}^i} \delta y_{L0} + \frac{\partial \rho_{Li}}{\partial z_{L0}}\bigg|_{\hat{r}_{Li}^i} \delta z_{L0} + \frac{\partial \rho_{Li}}{\partial z_{Li}}\bigg|_{\hat{r}_{Li}^i} \delta y_{Li} + \frac{\partial \rho_{Li}}{\partial z_{Li}}\bigg|_{\hat{r}_{Li}^i} \delta z_{Li}.$$

Substituting for the Jacobian in the first-order Taylor series expansion, the error of the magnitude of the landmark vector $\vec{\rho}_{Li}$ is given by the following:

$$\rho_{Li} - \hat{\rho}_{Li} = \frac{1}{2}\frac{1}{\hat{\rho}_{Li}}2(\hat{y}_{L0} - \hat{y}_{Li})\delta y_{L0} +$$
$$\frac{1}{2}\frac{1}{\hat{\rho}_{Li}}2(\hat{y}_{L0} - \hat{y}_{Li})(-1)\delta y_{Li} + \ldots +$$
$$\frac{1}{2}\frac{1}{\hat{\rho}_{Li}}2(\hat{z}_{L0} - \hat{z}_{Li})\delta z_{L0} + \frac{1}{2}\frac{1}{\hat{\rho}_{Li}}2(\hat{z}_{L0} - \hat{z}_{Li})(-1)\delta z_{Li}$$
$$= \left[\frac{(\hat{y}_{L0} - \hat{y}_{Li})}{\hat{\rho}_{Li}} \frac{(\hat{z}_{L0} - \hat{z}_{Li})}{\hat{\rho}_{Li}}\right]\begin{bmatrix}\delta y_{L0} \\ \delta z_{L0}\end{bmatrix} -$$
$$\left[\frac{(\hat{y}_{L0} - \hat{y}_{Li})}{\hat{\rho}_{Li}} \frac{(\hat{z}_{L0} - \hat{z}_{Li})}{\hat{\rho}_{Li}}\right]\begin{bmatrix}\delta y_{Li} \\ \delta z_{Li}\end{bmatrix}$$
$$\delta \rho_{Li} = H_{\rho i}\delta \rho_{L0} - H_{\rho i}\delta p_{Li}.$$

The azimuth angle errors and the elevation angle errors are calculated similarly to the three-dimensional and two-dimensional range measurement errors. For example the azimuth angle is expressed according to the following equation:

$$\psi_{Li} = a\tan\left[\frac{Y_{Li} - Y_V}{X_{Li} - X_V}\right].$$

Performing a first-order Taylor series expansion about both the estimated vehicle position and the estimated landmark position yields:

$$\psi_{Li} = \hat{\psi}_{Li} + \frac{\partial \psi_{Li}}{\partial X_V}\bigg|_{\hat{R}_{Li}^{NED},\hat{R}_V^{NED}} \delta X_V + \frac{\partial \psi_{Li}}{\partial Y_V}\bigg|_{\hat{R}_{Li}^{NED},\hat{R}_V^{NED}} \delta Y_V + \frac{\partial \psi_{Li}}{\partial Z_V}\bigg|_{\hat{R}_{Li}^{NED},\hat{R}_V^{NED}} \delta Z_V + \ldots + \frac{\partial \psi_{Li}}{\partial X_{Li}}\bigg|_{\hat{R}_{Li}^{NED},\hat{R}_V^{NED}} \delta X_L + \frac{\partial \psi_{Li}}{\partial Y_{Li}}\bigg|_{\hat{R}_{Li}^{NED},\hat{R}_V^{NED}} \delta Y_L + \frac{\partial \psi_{Li}}{\partial Z_{Li}}\bigg|_{\hat{R}_{Li}^{NED},\hat{R}_V^{NED}} \delta Z_{Li}.$$

Substituting for the Jacobian in the first-order Taylor series expansion, the error of the magnitude of the azimuth angle is given by the following:

$$\rho_{Li}^2 = (X_{Li} - X_V)^2 + (Y_{Li} - Y_V)^2$$

$$\psi_{Li} - \hat{\psi}_{Li} = \frac{(\hat{X}_{Li} - \hat{X}_V)^2}{(\hat{X}_{Li} - \hat{X}_V)^2 + (\hat{Y}_{Li} - \hat{Y}_V)^2}\left[(\hat{Y}_{Li} - \hat{Y}_V)(-1)(\hat{X}_{Li} - \hat{X}_V)^{-2}\right.$$
$$(-1)\delta X_V + \ldots + (\hat{X}_{Li} - \hat{X}_V)^{-1}(-1)\delta Y_V + (0)\delta Z_V +$$
$$(\hat{Y}_{Li} - \hat{Y}_V)(-1)(\hat{X}_{Li} - \hat{X}_V)^{-2}\delta X_{Li} + \ldots +$$
$$\left.(\hat{X}_{Li} - \hat{X}_V)^{-1}\delta Y_{Li} + (0)\delta Z_{Li}\right]$$
$$= \left[\frac{(\hat{Y}_{Li} - \hat{Y}_V)}{\hat{\rho}_{Li}^2} - \frac{(\hat{X}_{Li} - \hat{X}_V)}{\hat{\rho}_{Li}^2} \; 0\right]\begin{bmatrix}\delta X_V \\ \delta Y_V \\ \delta Z_V\end{bmatrix} + \ldots -$$
$$\left[\frac{(\hat{Y}_{Li} - \hat{Y}_V)}{\hat{\rho}_{Li}^2} - \frac{(\hat{X}_{Li} - \hat{X}_V)}{\hat{\rho}_{Li}^2} \; 0\right]\begin{bmatrix}\delta X_{Li} \\ \delta Y_{Li} \\ \delta Z_{Li}\end{bmatrix}$$
$$\delta \psi_{Li} = H_{\psi i}\delta_V - H_{\psi i}\delta R_{Li}.$$

Further, the elevation angle is expressed according to the following equation:

$$\theta_{Li} = a\tan\left[\frac{-(Z_{Li} - Z_V)}{[(X_{Li} - X_V)^2 + (Y_{Li} - Y_V)^2]^{\frac{1}{2}}}\right].$$

Performing a first-order Taylor series expansion about both the estimated vehicle position and the estimated landmark position yields:

$$\theta_{Li} = \hat{\theta}_{Li} + \frac{\partial \theta_{Li}}{\partial X_V}\bigg|_{\hat{R}_{Li}^{NED},\hat{R}_V^{NED}} \delta X_V + \frac{\partial \theta_{Li}}{\partial Y_V}\bigg|_{\hat{R}_{Li}^{NED},\hat{R}_V^{NED}} \delta Y_V + \frac{\partial \theta_{Li}}{\partial Z_V}\bigg|_{\hat{R}_{Li}^{NED},\hat{R}_V^{NED}} \delta Z_V + \ldots + \frac{\partial \theta_{Li}}{\partial X_{Li}}\bigg|_{\hat{R}_{Li}^{NED},\hat{R}_V^{NED}} \delta X_{Li} + \frac{\partial \theta_{Li}}{\partial Y_{Li}}\bigg|_{\hat{R}_{Li}^{NED},\hat{R}_V^{NED}} \delta Y_{Li} + \frac{\partial \theta_{Li}}{\partial Z_{Li}}\bigg|_{\hat{R}_{Li}^{NED},\hat{R}_V^{NED}} \delta Z_{Li}.$$

Substituting for the Jacobian in the first-order Taylor series expansion, the error of the magnitude of the elevation angle is given by the following:

$$\rho_{Li}^2 = (X_{Li} - X_V)^2 + (Y_{Li} - Y_V)^2$$

$$\theta_{Li} - \hat{\theta}_{Li} = \frac{\hat{\rho}_{Li}^2}{\hat{r}_{Li}^2}\left[-(\hat{Z}_{Li} - \hat{Z}_V)\left(-\frac{1}{2}\right)\hat{\rho}_{Li}^{-3}2(\hat{X}_{Li} - \hat{X}_V)(-1)\delta X_V + \ldots -\right.$$
$$\left.(\hat{Z}_{Li} - \hat{Z}_V)\left(-\frac{1}{2}\right)\hat{\rho}_{Li}^{-3}2(\hat{Y}_{Li} - \hat{Y}_V)(-1)\delta Y_V - \hat{\rho}_{Li}^{-1}(-1)\delta Z_V \ldots -\right.$$

-continued $$(\hat{Z}_{Li} - \hat{Z}_V)\left(-\frac{1}{2}\right)\hat{\rho}_{Li}^{-3} 2(\hat{X}_{Li} - \hat{X}_V)\delta X_{Li} + \ldots -$$

$$(\hat{Z}_{Li} - \hat{Z}_V)\left(-\frac{1}{2}\right)\hat{\rho}_{Li}^{-3} 2(\hat{Y}_{Li} - \hat{Y}_V)\delta Y_{Li} - \hat{\rho}_{Li}^{-1}\delta Z_{Li}]$$

$$= \left[-\frac{(\hat{X}_{Li} - \hat{X}_V)(\hat{Z}_{Li} - \hat{Z}_V)}{\hat{r}_{Li}^2 \hat{\rho}_{Li}} - \frac{(\hat{Y}_{Li} - \hat{Y}_V)(\hat{Z}_{Li} - \hat{Z}_V)}{\hat{r}_{Li}^2 \hat{\rho}_{Li}} \frac{\hat{\rho}_{Li}}{\hat{r}_{Li}^2}\right]\begin{bmatrix}\delta X_V \\ \delta Y_V \\ \delta Z_V\end{bmatrix} + \ldots -$$

$$\left[-\frac{(\hat{X}_{Li} - \hat{X}_V)(\hat{Z}_{Li} - \hat{Z}_V)}{\hat{r}_{Li}^2 \hat{\rho}_{Li}} - \frac{(\hat{Y}_{Li} - \hat{Y}_V)(\hat{Z}_{Li} - \hat{Z}_V)}{\hat{r}_{Li}^2 \hat{\rho}_{Li}} \frac{\hat{\rho}_{Li}}{\hat{r}_{Li}^2}\right]\begin{bmatrix}\delta X_L \\ \delta Y_L \\ \delta Z_L\end{bmatrix}$$

$$\delta\theta_{Li} = H_{\theta i}\delta R_V - H_{\theta i}\delta R_{Li}.$$

Figure 4:
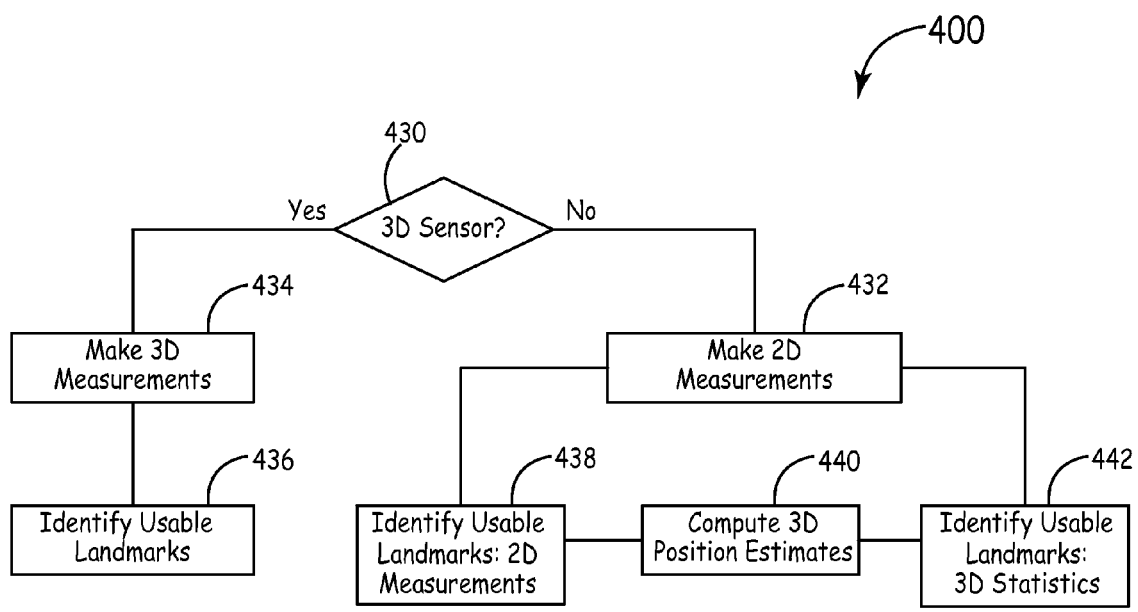
FIG. 4 is a high level flow diagram for landmark selection according to one embodiment.

FIG. 4 is a high level flow diagram of a method 400 for the selection of useable landmarks by a vision based navigation system 100 as described in FIG. 1 to limit the effects of sensor measurement errors. As described above, processing unit 114, when executing landmark selection instructions 118, selects a subset of the identified landmarks in the data received from image sensor 122. As shown by the flow diagram illustrating method 400, a determination 430 is made as to whether image sensor 122 provides three-dimensional measurements by an image sensor such as a LiDAR or two-dimensional measurements by an image sensor such as a camera.

When the vision based navigation system 100 determines that the measurements were provided by a sensor capable of providing three-dimensional measurements, the method 400 proceeds to 434 where image sensor 122 makes three-dimensional measurements. When the measurements are made, method 400 proceeds to 436 where the vision based navigation system 100 identifies the landmarks in the recently acquired measurements from image sensor 122. After, the vision based navigation system 100 identifies the landmarks from the image sensor measurements, the vision based navigation system 100 identifies the useable landmarks by comparing the identified landmarks against landmark information stored in landmark database 114. Further, after the useable landmarks are identified, the vision based navigation system 100 selects a subset of landmarks from all of the useable landmarks. The selected subset of useable landmarks allows processing unit 124 to complete processing of corrections without unduly increasing errors of the updated navigation solution 110.

Further, when the vision based navigation system 100 determines that the measurements were provided by a sensor capable of providing two-dimensional measurements, the method 400 proceeds to 432 where image sensor 122 makes two-dimensional measurements. When the measurements are made, method 400 proceeds to 438 where the vision based navigation system 100 identifies landmarks from the recently acquired two-dimensional measurements. After, the vision based navigation system 100 identifies the landmarks, the vision based navigation system 100 identifies the useable landmarks by comparing the identified landmarks against landmark information stored in landmark database 114. Also, the vision based navigation system 100 selects a subset from all of the useable landmarks. In a further implementation, method 400 proceeds to 440 where the vision based navigation system 100 identifies the useable landmarks and uses the predicted navigation solution and previously stored three-dimensional useable landmark data to compute three-dimensional useable landmark data from the two-dimensional measurements. When vision based navigation system 100 creates three-dimensional useable landmark data from the two-dimensional useable landmark data, the stored landmark information, and the estimated navigation solution 110, method 400 proceeds to 442 where the vision based navigation system 100 calculates the DOP to identify a subset of all the possible useable landmarks to facilitate the computation of corrections for the navigation solution 110.

Figure 5:
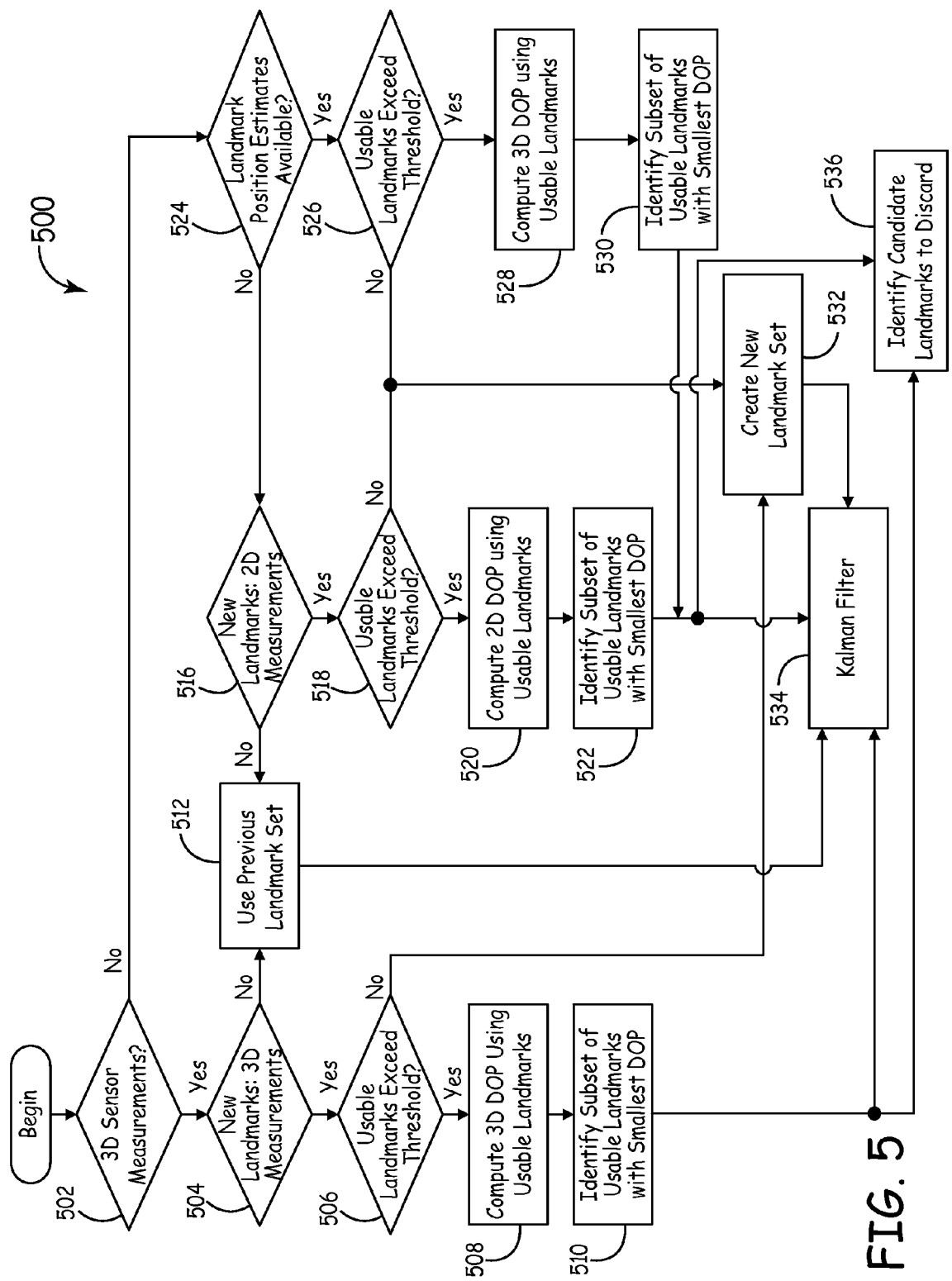
FIG. 5 is a flow diagram for landmark selection according to one embodiment.

FIG. 5 is a flow diagram for landmark selection that illustrates a method 500 for landmark selection that is one embodiment of the high level method 400 described in relation to FIG. 4. Method 500 begins at three-dimensional measurements 502 where the vision based navigation system 100 in FIG. 1 determines whether image sensor 122 provides three-dimensional measurements. If the vision based navigation system 100 determines that image sensor 122 provides three-dimensional measurements, the method 500 proceeds to 504, where the vision based navigation system 100 determines whether the three-dimensional measurements contain new useable landmarks. If the processing unit 124 fails to identify any new useable landmarks, the method 500 proceeds to 512, where the vision based navigation system 100 will determine the motion of a vehicle based on the most recently identified useable landmarks to compute corrections for the navigation solution.

If there are new useable landmarks, the method 500 proceeds to 506, where the vision based navigation system 100 determines whether the number of useable landmarks in the present measurements exceeds a landmark threshold. The landmark threshold is a number that limits the number of landmarks that the vision based navigation system 100 can process without impacting the computational performance of the vision based navigation system 100. For example, in one exemplary implementation, the system is able to process up to ten useable landmarks without incurring processing delays. If the number of useable landmarks identified by processing unit 124 fails to exceed the landmark threshold, method 500 proceeds to 532, where a new landmark set is created that includes all the useable landmarks and the useable landmarks are used to calculate corrections for the navigation solution. If the processing unit 124 identifies more useable landmarks than the system is computationally capable of handling, the method proceeds to 508, where the processing unit 124 computes the three-dimensional DOP using subsets of the useable landmarks identified by processing unit 124. After the processing unit 124 computes the three-dimensional DOP using subsets of the useable landmarks, the method 500 proceeds to 510 where the processing unit 124 identifies the subset of useable landmarks that has the smallest DOP from the possible combinations of useable landmarks identified by the processing unit 124, where the number of landmarks in the subset is less than or equal to the landmark threshold for the vision based navigation system 100. When the processing unit 124 has identified the subset of useable landmarks with the smallest DOP, the processing unit 124 calculates corrections for the navigation solution based on changes between the line of sight vectors from previously identified landmarks and the current subset of useable landmarks. When processing unit 124 calculates the corrections for the navigation solution, method 500 proceeds to 534, where the corrections are used in a Kalman filter to update a predicted navigation solution.

In certain embodiments, when processing unit 124 executes landmark selection instructions 118, the processing unit 124 calculates the three-dimensional DOP according to the following equations for the useable landmarks. The processing unit 124 calculates the DOP for subsets of the useable landmarks to identify the subset that has the smallest DOP to limit the effects of measurement errors on the corrections for the navigation solution. The measurement error for landmark variable position vector $\vec{r}_L$ for N different landmarks is given by the following equation:

$$\begin{bmatrix} \delta r_{L1} \\ \vdots \\ \delta r_{LN} \end{bmatrix} = \begin{bmatrix} H_{r1} \\ \vdots \\ H_{rN} \end{bmatrix} \delta R_V - \begin{bmatrix} H_{r1} & 0 & 0 \\ 0 & \ddots & 0 \\ 0 & 0 & H_{rN} \end{bmatrix} \begin{bmatrix} \delta R_{L1} \\ \vdots \\ \delta R_{LN} \end{bmatrix},$$

which can be restated as follows in matrix form:

$$\delta \bar{r}_L = \hat{H}_r \delta R_V - \tilde{H}_r \delta \bar{R}_L.$$

The equation can be multiplied through by the term $\hat{H}_r^T P$ and rearranged to solve for the vehicle position error vector $\delta R_V$ as follows:

$$\hat{H}_r^T P \delta \bar{r}_L = \hat{H}_r^T P \hat{H}_r \delta R_V - \hat{H}_r^T P \tilde{H}_r \delta \bar{R}_L,$$

$$\delta R_V = (\hat{H}_r^T P \hat{H}_r)^{-1} \hat{H}_r^T P \delta \bar{r}_L + (\hat{H}_r^T P \hat{H}_r)^{-1} \hat{H}_r^T P \tilde{H}_r \delta \bar{R}_L,$$

where P is a symmetric weighting matrix, such that $P = P^T$.

In a further embodiment, the processing unit 124, executing landmark selection instructions 118, calculates the covariance matrix of the vehicle position vector $\vec{R}_V$ as follows:

$$E\{\delta R_V \delta R_V^T\} = E\left\{ \begin{bmatrix} (\hat{H}_r^T P \hat{H}_r)^{-1} \hat{H}_r^T P \delta \bar{r}_L + \\ (\hat{H}_r^T P \hat{H}_r)^{-1} \hat{H}_r^T P \tilde{H}_r \delta \bar{R}_L \end{bmatrix} \begin{bmatrix} (\hat{H}_r^T P \hat{H}_r)^{-1} \hat{H}_r^T P \delta \bar{r}_L + \\ (\hat{H}_r^T P \hat{H}_r)^{-1} \hat{H}_r^T P \tilde{H}_r \delta \bar{R}_L \end{bmatrix}^T \right\}$$

$$= E\left\{ \begin{bmatrix} (\hat{H}_r^T P \hat{H}_r)^{-1} \hat{H}_r^T P \delta \bar{r}_L + \\ (\hat{H}_r^T P \hat{H}_r)^{-1} \hat{H}_r^T P \tilde{H}_r \delta \bar{R}_L \end{bmatrix} \begin{bmatrix} \delta \bar{r}_L^T P \hat{H}_r (\hat{H}_r^T P \hat{H}_r)^{-T} + \\ \delta \bar{R}_L^T \tilde{H}_r^T P \hat{H}_r (\hat{H}_r^T P \hat{H}_r)^{-T} \end{bmatrix} \right\}$$

$$= (\hat{H}_r^T P \hat{H}_r)^{-1} \hat{H}_r^T P E\{\delta \bar{r}_L \delta \bar{r}_L^T\} P \hat{H}_r (\hat{H}_r^T P \hat{H}_r)^{-T} +$$

$$(\hat{H}_r^T P \hat{H}_r)^{-1} \hat{H}_r^T P E\{\delta \bar{r}_L \delta \bar{R}_L^T\} \tilde{H}_r^T P \hat{H}_r (\hat{H}_r^T P \hat{H}_r)^{-T} +$$

$$(\hat{H}_r^T P \hat{H}_r)^{-1} \hat{H}_r^T P \tilde{H}_r E\{\delta \bar{R}_L \delta \bar{r}_L^T\} P \hat{H}_r (\hat{H}_r^T P \hat{H}_r)^{-T} +$$

$$(\hat{H}_r^T P \hat{H}_r)^{-1} \hat{H}_r^T P \tilde{H}_r E\{\delta \bar{R}_L \delta \bar{R}_L^T\} \tilde{H}_r^T P \hat{H}_r (\hat{H}_r^T P \hat{H}_r)^{-T}.$$

In at least one embodiment, the measurement error of the landmark variable position vector $\vec{r}_L$ is calculated according to the following equation:

$$\delta \bar{r}_L = U \Sigma V^T$$

where $$U U^T = U^T U = I,$$

$$V V^T = V^T V = I.$$

Further:

$\Sigma$ = singular values of $\delta \bar{r}_L$, $\sigma_{max}$ = maximum singular value of $\Sigma$ where:

$$\delta \bar{r}_L \delta \bar{r}_L^T = U \Sigma V^T V \Sigma U^T = U \Sigma \Sigma U^T \leq U(\sigma_{max}^2 I) U^T = \sigma_{max}^2 I.$$

The covariance matrix of the measurement error for $\vec{r}_L$ is given by the following equation:

$$E\{\delta \bar{r}_L \delta \bar{r}_L^T\} \leq \sigma_{max}^2 I.$$

Further:

$$E\{\delta \bar{r}_L \delta \bar{R}_L^T\} = 0$$

The covariance matrix of $\vec{R}_V$ is given by:

$$E\{\delta R_V \delta R_V^T\} = (\hat{H}_r^T P \hat{H}_r)^{-1} \hat{H}_r^T P E\{\delta \bar{r}_L \delta \bar{r}_L^T\} P \hat{H}_r (\hat{H}_r^T P \hat{H}_r)^{-T} +$$

$$(\hat{H}_r^T P \hat{H}_r)^{-1} \hat{H}_r^T P \tilde{H}_r E\{\delta \bar{R}_L \delta \bar{R}_L^T\} \tilde{H}_r^T P \hat{H}_r (\hat{H}_r^T P \hat{H}_r)^{-T} \leq$$

$$\sigma_{max}^2 (\hat{H}_r^T P \hat{H}_r)^{-1} \hat{H}_r^T P^2 \hat{H}_r (\hat{H}_r^T P \hat{H}_r)^{-T} +$$

$$(\hat{H}_r^T P \hat{H}_r)^{-1} \hat{H}_r^T P \tilde{H}_r E\{\delta \bar{R}_L \delta \bar{R}_L^T\} \tilde{H}_r^T P \hat{H}_r (\hat{H}_r^T P \hat{H}_r)^{-T}.$$

In certain embodiments, if P is idempotent, then the covariance matrix of the vehicle position vector $\vec{R}_V$ can be represented by the following equations:

$$E\{\delta R_V \delta R_V^T\} \leq \sigma_{max}^2 (\hat{H}_r^T P \hat{H}_r)^{-1} \hat{H}_r^T P \tilde{H}_r (\hat{H}_r^T P \hat{H}_r)^{-T} +$$

$$(\hat{H}_r^T P \hat{H}_r)^{-1} \hat{H}_r^T P \tilde{H}_r E\{\delta \overline{R}_L \delta \overline{R}_L^T\} \tilde{H}_r^T P \hat{H}_r (\hat{H}_r^T P \hat{H}_r)^{-T} =$$

$$\sigma_{max}^2 (\hat{H}_r^T P \hat{H}_r)^{-1} + (\hat{H}_r^T P \hat{H}_r)^{-1} \hat{H}_r^T P \tilde{H}_r E\{\delta \overline{R}_L \delta \overline{R}_L^T\} \tilde{H}_r^T P \hat{H}_r (\hat{H}_r^T P \hat{H}_r)^{-T}$$

and the DOP for the subset of useable landmarks is given by:

$$\text{DOP} = \text{TRACE}(\hat{H}_r^T P \hat{H}_r)^{-1}.$$

Further, if P is represented as an identity matrix, the covariance matrix of the vehicle position vector $\vec{r}_V$ can be represented by the following equations $$E\{\delta R_V \delta R_V^T\} \leq \sigma_{max}^2 (\hat{H}_r^T \hat{H}_r)^{-1} \hat{H}_r^T \hat{H}_r (\hat{H}_r^T \hat{H}_r)^{-T} +$$

$$(\hat{H}_r^T \hat{H}_r)^{-1} \hat{H}_r^T \tilde{H}_r E\{\delta \overline{R}_L \delta \overline{R}_L^T\} \tilde{H}_r^T \hat{H}_r (\hat{H}_r^T \hat{H}_r)^{-T} =$$

$$\sigma_{max}^2 (\hat{H}_r^T \hat{H}_r)^{-1} + (\hat{H}_r^T \hat{H}_r)^{-1} \hat{H}_r^T \tilde{H}_r E\{\delta \overline{R}_L \delta \overline{R}_L^T\} \tilde{H}_r^T \hat{H}_r (\hat{H}_r^T \hat{H}_r)^{-T}$$

and the DOP for the subset of useable landmarks is given by:

$$\text{DOP} = \text{TRACE}(\hat{H}_r^T \hat{H}_r)^{-1}.$$

The processing unit 124, executing landmark selection instructions 118, selects the subset of useable landmarks with three-dimensional data that provides the smallest DOP according to the above equations for calculating the DOP.

In alternative embodiments, image sensor 122 provides two-dimensional measurements as compared to three-dimensional measurements. When image sensor 122 provides two-dimensional measurements, the method 500 proceeds from 502 to 524, where the landmark selector determines if there are landmark position estimates available for the landmarks identified in the two-dimensional measurements. When there are no landmark position estimates available, the method 500 proceeds from 524 to 516, where the processing unit 124 determines whether the two-dimensional measurements contain new useable landmarks. If the image processing unit 120 fails to identify any new useable landmarks, the method 500 proceeds to 512, where the vision based navigation system 100 will use the most recently identified useable landmarks to compute corrections for the navigation solution.

If there are new useable landmarks, the method 500 proceeds to 518, where the vision based navigation system 100 determines whether the number of useable landmarks in the present measurements exceeds the landmark threshold. If the number of useable landmarks identified by processing unit 124 fails to exceed the landmark threshold, method 500 proceeds to 532, where a new landmark set is created that includes all the useable landmarks and the useable landmarks are used to calculate corrections for the navigation solution. If the number of useable landmarks exceeds the landmark threshold, the method 500 proceeds to 520, where the processing unit 124 computes the two-dimensional DOP using subsets of the useable landmarks identified by processing unit 124. After the processing unit 124 computes the two-dimensional DOP using subsets of the useable landmarks, the method 500 proceeds to 522 where the processing unit 124, executing the landmark selection instructions 118, identifies the subset of useable landmarks that has the smallest DOP, where the number of landmarks in the subset is less than or equal to the landmark threshold of the vision based navigation system 100. When the processing unit 124 has identified the subset of useable landmarks with the smallest DOP, the processing unit 124 calculates corrections for the navigation solution based on changes between the line of sight vectors from previously identified landmarks and the current subset of useable landmarks. When processing unit 124 calculates the corrections for the navigation solution, method 500 proceeds to 534, where the corrections are used in a Kalman filter to update a predicted navigation solution.

In certain embodiments, when processing unit 124 executes landmark selection instructions 118, the processing unit 124 calculates the two-dimensional DOP according to the following equations for the identified useable landmarks.

The measurement error for landmark vector $\vec{\rho}_L$ for N different landmarks is given by the following equation:

$$\begin{bmatrix} \delta \rho_{L1} \\ \vdots \\ \delta \rho_{LN} \end{bmatrix} = \begin{bmatrix} H_{\rho 1} \\ \vdots \\ H_{\rho N} \end{bmatrix} \delta \rho_{L0} - \begin{bmatrix} H_{\rho 1} & 0 & 0 \\ 0 & \ddots & 0 \\ 0 & 0 & H_{\rho N} \end{bmatrix} \begin{bmatrix} \delta \rho_{L1} \\ \vdots \\ \delta \rho_{LN} \end{bmatrix},$$

which can be restated as follows in matrix form:

$$\delta \overline{\rho}_L = \hat{H}_\rho \delta \rho_{L0} - \tilde{H}_\rho \delta \overline{\rho}_L.$$

The equation can be multiplied through by the term $\hat{H}_\rho^T P$ and rearranged to solve for the reference vector $\vec{\rho}_{L0}$ as follows:

$$\hat{H}_\rho^T P \delta \overline{\rho}_L = \hat{H}_\rho^T P \hat{H}_\rho \delta \rho_{L0} - \hat{H}_\rho^T P \tilde{H}_\rho \delta \overline{\rho}_L$$

$$\delta \rho_{L0} = (\hat{H}_\rho^T P \hat{H}_\rho)^{-1} \hat{H}_\rho^T P \delta \overline{\rho}_L + (\hat{H}_\rho^T P \hat{H}_\rho)^{-1} \hat{H}_\rho^T P \tilde{H}_\rho \delta \overline{\rho}_L,$$

where P is a symmetric weighting matrix, $P = P^T$.

In a further embodiment, the processing unit 124, executing landmark selection instructions 118, calculates the covariance matrix of the reference vector $\vec{\rho}_{L0}$ as follows:

$$E\{\delta \rho_{L0} \delta \rho_{L0}^T\} = E\left\{ \begin{bmatrix} (\hat{H}_\rho^T P \hat{H}_\rho)^{-1} \hat{H}_\rho^T P \delta \overline{\rho}_L + \\ (\hat{H}_\rho^T P \hat{H}_\rho)^{-1} \hat{H}_\rho^T P \tilde{H}_\rho \delta \overline{\rho}_L \end{bmatrix} \begin{bmatrix} (\hat{H}_\rho^T P \hat{H}_\rho)^{-1} \hat{H}_\rho^T P \delta \overline{\rho}_L + \\ (\hat{H}_\rho^T P \hat{H}_\rho)^{-1} \hat{H}_\rho^T P \tilde{H}_\rho \delta \overline{\rho}_L \end{bmatrix}^T \right\}$$

$$= E\left\{ \begin{bmatrix} (\hat{H}_\rho^T P \hat{H}_\rho)^{-1} \hat{H}_\rho^T P \delta \overline{\rho}_L + \\ (\hat{H}_\rho^T P \hat{H}_\rho)^{-1} \hat{H}_\rho^T P \tilde{H}_\rho \delta \overline{\rho}_L \end{bmatrix} \begin{bmatrix} \delta \overline{\rho}_L^T P \hat{H}_\rho (\hat{H}_\rho^T P \hat{H}_\rho)^{-T} + \\ \delta \overline{\rho}_L^T \tilde{H}_\rho^T P \hat{H}_\rho (\hat{H}_\rho^T P \hat{H}_\rho)^{-T} \end{bmatrix} \right\}$$

$$= (\hat{H}_\rho^T P \hat{H}_\rho)^{-1} \hat{H}_\rho^T P E\{\delta \overline{\rho}_L \delta \overline{\rho}_L^T\} P \hat{H}_\rho (\hat{H}_\rho^T P \hat{H}_\rho)^{-T} +$$

$$(\hat{H}_\rho^T P \hat{H}_\rho)^{-1} \hat{H}_\rho^T P E\{\delta \overline{\rho}_L \delta \overline{\rho}_L^T\} \tilde{H}_\rho^T P \hat{H}_\rho (\hat{H}_\rho^T P \hat{H}_\rho)^{-T} +$$

-continued
$$\left(\hat{H}_\rho^T P \hat{H}_\rho\right)^{-1} \hat{H}_\rho^T P \tilde{H}_\rho E\{\delta \overline{p}_L \delta \overline{p}_L^T\} P \hat{H}_\rho \left(\hat{H}_\rho^T P \hat{H}_\rho\right)^{-T} +$$
$$\left(\hat{H}_\rho^T P \hat{H}_\rho\right)^{-1} \hat{H}_\rho^T P \tilde{H}_\rho E\{\delta \overline{p}_L \delta \overline{p}_L^T\} \tilde{H}_\rho^T P \hat{H}_\rho \left(\hat{H}_\rho^T P \hat{H}_\rho\right)^{-T}.$$

In at least one embodiment, the measurement error of the landmark vector $\vec{\rho}_L$ is calculated according to the following equation:

$$\delta \overline{\rho}_L = U \Sigma V^T$$

where $$UU^T = U^T U = I$$

$$VV^T = V^T V = I$$

Further:

$\Sigma$ = singular values of $\delta \overline{\rho}_L$, $\sigma_{max}$ = maximum singular value of $\Sigma$ where:

$$\delta \overline{\rho}_L \delta \overline{\rho}_L^T = U \Sigma V^T V \Sigma U^T = U \Sigma \Sigma U^T \le U(\sigma_{max}^2 I) U^T = \sigma_{max}^2 I.$$

The covariance matrix for the measurement error for $\vec{\rho}_L$ is given by the following equation:

$$E\{\delta \overline{\rho}_L \delta \overline{\rho}_L^T\} \le \sigma_{max}^2 I,$$

where $$E\{\delta \overline{\rho}_L \delta \overline{\rho}_L^T\} = 0.$$

The covariance matrix of $\vec{\rho}_{L0}$ is given by:

$$E\{\delta \rho_{L0} \delta \rho_{L0}^T\} = \left(\hat{H}_\rho^T P \hat{H}_\rho\right)^{-1} \hat{H}_\rho^T P E\{\delta \overline{p}_L \delta \overline{p}_L^T\} P \hat{H}_\rho \left(\hat{H}_\rho^T P \hat{H}_\rho\right)^{-T} +$$
$$\left(\hat{H}_\rho^T P \hat{H}_\rho\right)^{-1} \hat{H}_\rho^T P \tilde{H}_\rho E\{\delta \overline{p}_L \delta \overline{p}_L^T\} \tilde{H}_\rho^T P \hat{H}_\rho \left(\hat{H}_\rho^T P \hat{H}_\rho\right)^{-T} \le$$
$$\sigma_{max}^2 \left(\hat{H}_\rho^T P \hat{H}_\rho\right)^{-1} \hat{H}_\rho^T P^2 \hat{H}_\rho \left(\hat{H}_\rho^T P \hat{H}_\rho\right)^{-T} +$$
$$\left(\hat{H}_\rho^T P \hat{H}_\rho\right)^{-1} \hat{H}_\rho^T P \tilde{H}_\rho E\{\delta \overline{p}_L \delta \overline{p}_L^T\} \tilde{H}_\rho^T P \hat{H}_\rho \left(\hat{H}_\rho^T P \hat{H}_\rho\right)^{-T}.$$

In certain embodiments, if P is idempotent, then the covariance matrix of $\vec{\rho}_{L0}$ can be represented by the following equations:

$$E\{\delta \rho_{L0} \delta \rho_{L0}^T\} \le \sigma_{max}^2 \left(\hat{H}_\rho^T P \hat{H}_\rho\right)^{-1} \hat{H}_\rho^T P \hat{H}_\rho \left(\hat{H}_\rho^T P \hat{H}_\rho\right)^{-T} +$$
$$\left(\hat{H}_\rho^T P \hat{H}_\rho\right)^{-1} \hat{H}_\rho^T P \tilde{H}_\rho E\{\delta \overline{p}_L \delta \overline{p}_L^T\} \tilde{H}_\rho^T P \hat{H}_\rho \left(\hat{H}_\rho^T P \hat{H}_\rho\right)^{-T} =$$
$$\sigma_{max}^2 \left(\hat{H}_\rho^T P \hat{H}_\rho\right)^{-1} + \left(\hat{H}_\rho^T P \hat{H}_\rho\right)^{-1} \hat{H}_\rho^T P \tilde{H}_\rho E\{\delta \overline{p}_L \delta \overline{p}_L^T\} \tilde{H}_\rho^T P \hat{H}_\rho \left(\hat{H}_\rho^T P \hat{H}_\rho\right)^{-T}$$

and the DOP for the set of landmarks is given by:

$$DOP = TRACE[(\hat{H}_\rho^T P \hat{H}_\rho)^{-1}].$$

Further, if P is represented as an identity matrix, the covariance matrix of $\vec{\rho}_{L0}$ can be represented by the following equations:

$$E\{\delta \rho_{L0} \delta \rho_{L0}^T\} \le \sigma_{max}^2 \left(\hat{H}_\rho^T \hat{H}_\rho\right)^{-1} \hat{H}_\rho^T \hat{H}_\rho \left(\hat{H}_\rho^T \hat{H}_\rho\right)^{-T} +$$
$$\left(\hat{H}_\rho^T \hat{H}_\rho\right)^{-1} \hat{H}_\rho^T \tilde{H}_\rho E\{\delta \overline{p}_L \delta \overline{p}_L^T\} \tilde{H}_\rho^T \hat{H}_\rho \left(\hat{H}_\rho^T \hat{H}_\rho\right)^{-T} =$$
$$\sigma_{max}^2 \left(\hat{H}_\rho^T \hat{H}_\rho\right)^{-1} + \left(\hat{H}_\rho^T \hat{H}_\rho\right)^{-1} \hat{H}_\rho^T \tilde{H}_\rho E\{\delta \overline{p}_L \delta \overline{p}_L^T\} \tilde{H}_\rho^T \hat{H}_\rho \left(\hat{H}_\rho^T \hat{H}_\rho\right)^{-T}$$

and the DOP for the subset of useable landmarks is given by:

$$DOP = TRACE[(\hat{H}_\rho^T \hat{H}_\rho)^{-1}].$$

The processing unit 124, executing landmark selection instructions 118, selects the subset of useable landmarks with two-dimensional data from the identified useable landmarks that provides the smallest DOP according to the above equations for the DOP.

In at least one embodiment, instead of performing DOP computations on two-dimensional measurements, the processing unit 124 receives landmark position estimates from landmark database 114 and uses the landmark position estimates and the predicted navigation solution to create three-dimensional estimates associated with the landmarks identified using two-dimensional data identified in the measurements received from the image sensor 122. When, the processing unit 124 is able to create three-dimensional landmark estimates for the landmarks identified using two-dimensional data, method 500 proceeds from 524 to 526, where the vision based navigation system 100 determines the useable landmarks from the identified landmarks, and determines whether the number of useable landmarks in the present measurements exceed a landmark threshold. If the number of useable landmarks identified by processing unit 124 fails to exceed the landmark threshold, method 500 proceeds to 532, where a new landmark set is created that includes all the useable landmarks and the useable landmarks are used to calculate corrections for the navigation solution. However, if the number of useable landmarks exceeds the landmark threshold, method 500 proceeds to 528, where the processing unit 124 computes the three-dimensional DOP using subsets of the useable landmarks that were created using the landmark position estimates. When the processing unit 124 computes the three-dimensional DOP using the useable landmarks, the method 500 proceeds to 530 where the processing unit 124, executing the landmark selection instructions 118, identifies the subset of the useable landmarks that has the smallest DOP from the possible combinations of useable landmarks identified by the processing unit 124, where the number of landmarks in the subset is less than or equal to the landmark threshold of the vision based navigation system 100. When the processing unit 124 has identified the subset of useable landmarks with the smallest DOP, the processing unit 124 calculates corrections for the predicted navigation solution based on changes between the line of sight vectors from previously identified landmarks and the current subset of useable landmarks. When processing unit 124 calculates the corrections for the navigation solution, method 500 proceeds to 534, where the corrections are used in a Kalman filter to update a predicted navigation solution.

In certain embodiments, when processing unit 124 executes landmark selection instructions 118, the processing unit 124 calculates the three-dimensional DOP according to the following equations for the identified useable landmarks using the landmark position estimates. The measurement error for landmark variable position vector $r_L$ for N different landmarks is defined by the following equations:

$$\begin{bmatrix} \delta r_{Li} \\ \delta \psi_{Li} \\ \delta \theta_{Li} \end{bmatrix} = \begin{bmatrix} H_{ri} \\ H_{\psi i} \\ H_{\theta i} \end{bmatrix} \delta R_V - \begin{bmatrix} H_{ri} \\ H_{\psi i} \\ H_{\theta i} \end{bmatrix} \delta R_{Li},$$

which can be restated as follows in matrix form:

$$\delta r_{3D,Li} = H_{3D,i} \delta R_V - H_{3D,i} \delta R_{Li}.$$

The above equation can be stated similarly to the other DOP formulations described above as follows:

$$\begin{bmatrix} \delta r_{3D,L1} \\ \vdots \\ \delta r_{3D,LN} \end{bmatrix} = \begin{bmatrix} H_{3D,1} \\ \vdots \\ H_{3D,N} \end{bmatrix} \delta R_V - \begin{bmatrix} H_{3D,1} & 0 & 0 \\ 0 & \ddots & 0 \\ 0 & 0 & H_{3D,N} \end{bmatrix} \begin{bmatrix} \delta R_{L1} \\ \vdots \\ \delta R_{LN} \end{bmatrix}$$

which can be restated as follows in matrix form:

$$\delta \bar{r}_{3D} = \hat{H}_{3D} \delta R_V - \tilde{H}_{3D} \delta \bar{R}_L.$$

The equation can be multiplied through by the term $\hat{H}_{3D}^T P$ and rearranged to solve for the vehicle position vector $\vec{R}_V$ as follows:

$$\hat{H}_{3D}^T P \delta \bar{r}_{3D} = \hat{H}_{3D}^T P \hat{H}_{3D} \delta R_V - \hat{H}_{3D}^T P \tilde{H}_{3D} \delta \bar{R}_L,$$

$$\delta R_V = (\hat{H}_{3D}^T P \hat{H}_{3D})^{-1} \hat{H}_{3D}^T P \delta \bar{r}_{3D} + (\hat{H}_{3D}^T P \hat{H}_{3D})^{-1} \hat{H}_{3D}^T P \tilde{H}_{3D} \delta \bar{R}_L,$$

where P is a symmetric weighting matrix, $P = P^T$.

In a further embodiment, the processing unit 124, executing landmark selection instructions 118, calculates the covariance matrix of the vehicle position vector $\vec{R}_V$ as follows:

$$E\{\delta R_V \delta R_V^T\} = E\left\{ \begin{bmatrix} (\hat{H}_{3D}^T P \hat{H}_{3D})^{-1} \hat{H}_{3D}^T P \delta \bar{r}_{3D} + \\ (\hat{H}_{3D}^T P \hat{H}_{3D})^{-1} \hat{H}_{3D}^T P \tilde{H}_{3D} \delta \bar{R}_L \end{bmatrix} \begin{bmatrix} (\hat{H}_{3D}^T P \hat{H}_{3D})^{-1} \hat{H}_{3D}^T P \delta \bar{r}_{3D} + \\ (\hat{H}_{3D}^T P \hat{H}_{3D})^{-1} \hat{H}_{3D}^T P \tilde{H}_{3D} \delta \bar{R}_L \end{bmatrix}^T \right\}$$

$$= E\left\{ \begin{bmatrix} (\hat{H}_{3D}^T P \hat{H}_{3D})^{-1} \hat{H}_{3D}^T P \delta \bar{r}_{3D} + \\ (\hat{H}_{3D}^T P \hat{H}_{3D})^{-1} \hat{H}_{3D}^T P \tilde{H}_{3D} \delta \bar{R}_L \end{bmatrix} \begin{bmatrix} \delta \bar{r}_{3D}^T P \hat{H}_{3D} (\hat{H}_{3D}^T P \hat{H}_{3D})^{-T} + \\ \delta \bar{R}_L^T \tilde{H}_{3D}^T P \hat{H}_{3D} (\hat{H}_{3D}^T P \hat{H}_{3D})^{-T} \end{bmatrix} \right\}$$

$$= (\hat{H}_{3D}^T P \hat{H}_{3D})^{-1} \hat{H}_{3D}^T P E\{\delta \bar{r}_{3D} \delta \bar{r}_{3D}^T\} P \hat{H}_{3D} (\hat{H}_{3D}^T P \hat{H}_{3D})^{-T} +$$

$$(\hat{H}_{3D}^T P \hat{H}_{3D})^{-1} \hat{H}_{3D}^T P E\{\delta \bar{r}_{3D} \delta \bar{R}_L^T\} \tilde{H}_{3D}^T P \hat{H}_{3D} (\hat{H}_{3D}^T P \hat{H}_{3D})^{-T} +$$

$$(\hat{H}_{3D}^T P \hat{H}_{3D})^{-1} \hat{H}_{3D}^T P \tilde{H}_{3D} E\{\delta \bar{R}_L \delta \bar{r}_{3D}^T\} P \hat{H}_{3D} (\hat{H}_{3D}^T P \hat{H}_{3D})^{-T} +$$

$$(\hat{H}_{3D}^T P \hat{H}_{3D})^{-1} \hat{H}_{3D}^T P \tilde{H}_{3D} E\{\delta \bar{R}_L \delta \bar{R}_L^T\} \tilde{H}_{3D}^T P \hat{H}_{3D} (\hat{H}_{3D}^T P \hat{H}_{3D})^{-T}$$

In at least one embodiment, the measurement error of the landmark variable position vector $\vec{r}_{3D}$ is calculated according to the following equation:

$$\delta \bar{r}_{3D} = U \Sigma V^T$$

where $$UU^T = U^T U = I$$

$$VV^T = V^T V = I$$

Further:

$\Sigma$ = singular values of $\delta \bar{r}_{3D}$, $\sigma_{max}$ = maximum singular value of $\Sigma$ where:

$$\delta \bar{r}_{3D} \delta \bar{r}_{3D}^T = U \Sigma V^T V \Sigma U^T = U \Sigma \Sigma U^T \leq U(\sigma_{max}^2 I) U^T = \sigma_{max}^2 I.$$

The covariance matrix for the measurement error for $\vec{r}_{3D}$ is given by the following equation:

$$E\{\delta \bar{r}_{3D} \delta \bar{r}_{3D}^T\} \leq \sigma_{max}^2 I,$$

where $$E\{\delta \bar{r}_{3D} \delta \bar{r}_{3D}^T\} = 0.$$

The covariance matrix of $\vec{R}_V$ is given by:

$$E\{\delta R_V \delta R_V^T\} = (\hat{H}_{3D}^T P \hat{H}_{3D})^{-1} \hat{H}_{3D}^T P E\{\delta \bar{r}_{3D} \delta \bar{r}_{3D}^T\} P \hat{H}_{3D} (\hat{H}_{3D}^T P \hat{H}_{3D})^{-T} +$$

$$(\hat{H}_{3D}^T P \hat{H}_{3D})^{-1} \hat{H}_{3D}^T P \tilde{H}_{3D} E\{\delta \bar{R}_L \delta \bar{R}_L^T\} \tilde{H}_{3D}^T P \hat{H}_{3D} (\hat{H}_{3D}^T P \hat{H}_{3D})^{-T} \leq$$

$$\sigma_{max}^2 (\hat{H}_{3D}^T P \hat{H}_{3D})^{-1} \hat{H}_{3D}^T P^2 \hat{H}_{3D} (\hat{H}_{3D}^T P \hat{H}_{3D})^{-T} +$$

$$(\hat{H}_{3D}^T P \hat{H}_{3D})^{-1} \hat{H}_{3D}^T P \tilde{H}_{3D} E\{\delta \bar{R}_L \delta \bar{R}_L^T\} \tilde{H}_{3D}^T P \hat{H}_{3D} (\hat{H}_{3D}^T P \hat{H}_{3D})^{-T}.$$

In certain embodiments, if P is idempotent, then the covariance matrix of $\vec{R}_V$ can be represented by the following equations:

$$E\{\delta R_V \delta R_V^T\} \leq \sigma_{max}^2 (\hat{H}_{3D}^T P \hat{H}_{3D})^{-1} \hat{H}_{3D}^T P \hat{H}_{3D} (\hat{H}_{3D}^T P \hat{H}_{3D})^{-T} +$$

$$(\hat{H}_{3D}^T P \hat{H}_{3D})^{-1} \hat{H}_{3D}^T P \tilde{H}_{3D} E\{\delta \bar{R}_L \delta \bar{R}_L^T\} \tilde{H}_{3D}^T P \hat{H}_{3D} (\hat{H}_{3D}^T P \hat{H}_{3D})^{-T} =$$

-continued $$\sigma_{max}^2 (\hat{H}_{3D}^T P \hat{H}_{3D})^{-1} + (\hat{H}_{3D}^T P \hat{H}_{3D})^{-1} \hat{H}_{3D}^T P \tilde{H}_{3D} E$$

$$\{\delta \bar{R}_L \delta \bar{R}_L^T\} \tilde{H}_{3D}^T P \hat{H}_{3D} (\hat{H}_{3D}^T P \hat{H}_{3D})^{-T}$$

and the DOP for the subset of useable landmarks is given by:

$$DOP = TRACE(\hat{H}_{3D}^T P \hat{H}_{3D})^{-1}.$$

Further, if P is represented as an identity matrix, the covariance matrix of $\vec{R}_V$ can be represented by the following equations $$E\{\delta R_V \delta R_V^T\} \leq \sigma_{max}^2 (\hat{H}_{3D}^T \hat{H}_{3D})^{-1} \hat{H}_{3D}^T \hat{H}_{3D} (\hat{H}_{3D}^T \hat{H}_{3D})^{-T} +$$
$$(\hat{H}_{3D}^T \hat{H}_{3D})^{-1} \hat{H}_{3D}^T \tilde{H}_{3D} E\{\delta \overline{R}_L \delta \overline{R}_L^T\} \tilde{H}_{3D}^T \hat{H}_{3D} (\hat{H}_{3D}^T \hat{H}_{3D})^{-T} =$$
$$\sigma_{max}^2 (\hat{H}_{3D}^T \hat{H}_{3D})^{-1} + (\hat{H}_{3D}^T \hat{H}_{3D})^{-1} \hat{H}_{3D}^T \tilde{H}_{3D} E$$
$$\{\delta \overline{R}_L \delta \overline{R}_L^T\} \tilde{H}_{3D}^T \hat{H}_{3D} (\hat{H}_{3D}^T \hat{H}_{3D})^{-T}$$

and the DOP for the subset of useable landmarks is given by:

$$DOP = TRACE(\hat{H}_{3D}^T \hat{H}_{3D})^{-1}.$$

The processing unit 124, executing landmark selection instructions 118, selects the subset of useable landmarks with three-dimensional data from the identified useable landmarks that provides the smallest DOP according to the above equations for calculating the DOP.

In certain embodiments, when a subset of useable landmarks has been identified, method 500 proceeds to 536, where landmarks that are candidates for being discarded during subsequent measurement updates are identified. To identify candidates for discarding, the useable landmarks in a subset of useable landmarks are ranked according to the effect of the position of the landmark on the DOP calculation. For example, when a subset of useable landmarks is limited to ten landmarks, the landmarks that have the largest contribution to the DOP can be marked for discarding upon the reception of new landmarks for processing from subsequent measurements with image sensors 122. The identifying of landmarks for discarding during subsequent measurement updates helps maintain a lower DOP calculation when future landmarks are received through image sensors 122.

Figure 6:
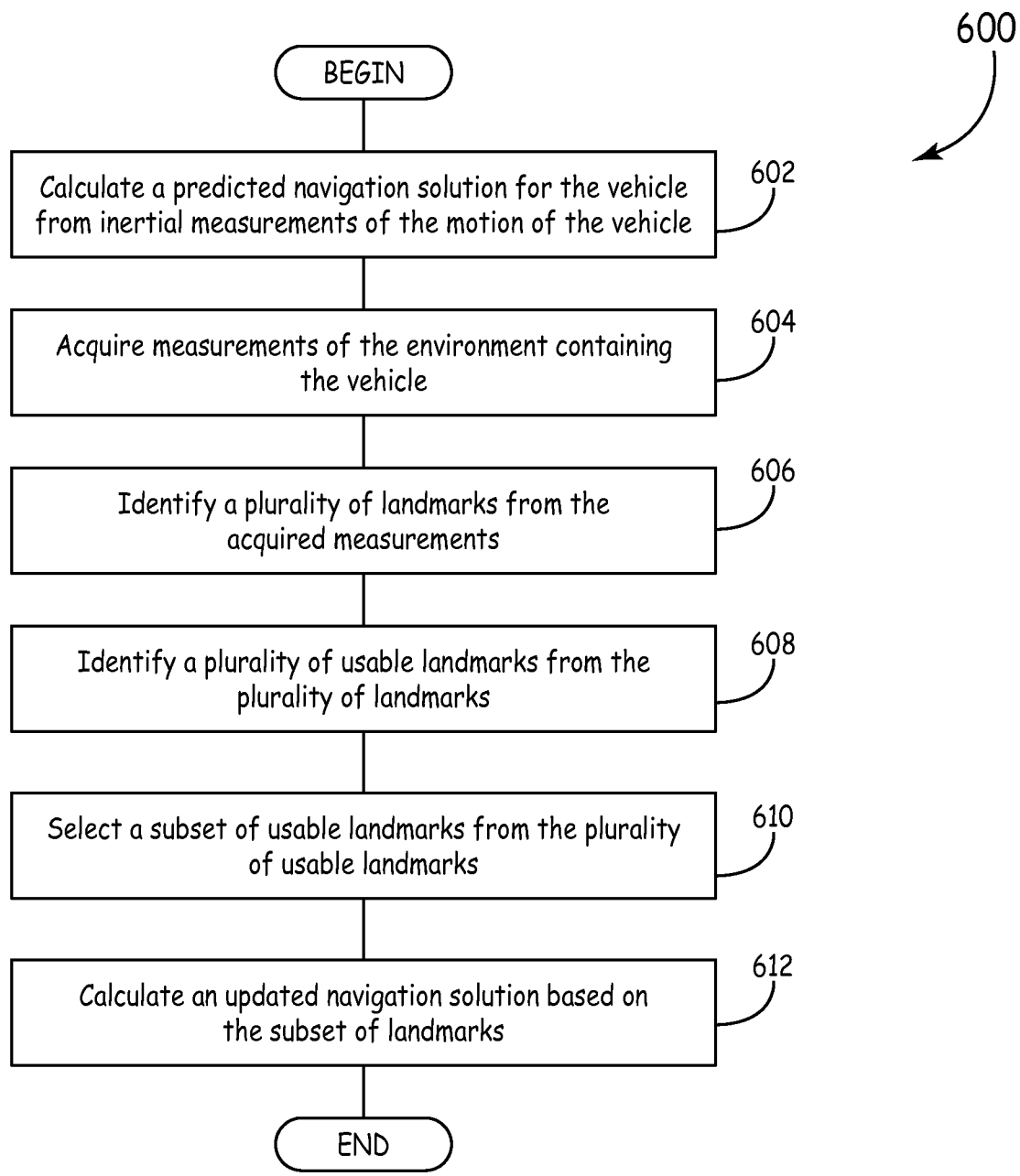
FIG. 6 is a flow diagram of a method for selecting landmarks for a vehicle navigation system according to one embodiment.

FIG. 6 is a flow diagram of a method 600 for vision based navigation. The method 600 begins at 602, where a navigation solution for a vehicle is calculated from inertial measurements of the motion of a vehicle. For example, a navigation computer computes a navigation solution using measurements of angular velocity and specific force from an IMU. Method 600 proceeds to 604, where measurements of the environment containing the vehicle are acquired. For example, image sensors mounted on the vehicle measure the environment containing the vehicle.

In at least one embodiment, method 600 proceeds to 606, where a plurality of landmarks in the environment is identified from the acquired measurements. In at least one exemplary embodiment, a processing unit in the navigation computer receives the measurements and identifies landmarks or features in the environment based on the acquired measurements. The identified landmarks can be used to determine the motion of the vehicle from a first time period to a second time period by comparing the position vector of the identified landmarks measured during the first time period to the position vector of the identified landmarks measured during the second time period. Further, method 600 proceeds to 608 where a plurality of useable landmarks is identified from the plurality of landmarks. For example, landmarks from the current image sensor measurement that correspond to previously identified landmarks are designated as useable landmarks.

In certain embodiments, method 600 proceeds to 610, where a subset of landmarks is selected from the plurality of useable landmarks. In at least one implementation the subset of landmarks has a smaller DOP than other possible subsets of landmarks from the plurality of useable landmarks. For instance, the processing unit determines the DOP for the different possible sets of landmarks in the plurality of useable landmarks, where the number of landmarks in the subset of landmarks is less than or equal to a landmark threshold. The processing unit then identifies the subset of landmarks that has the smallest DOP. Method 600 then proceeds to 612, where an updated navigation solution is calculated based on the subset of landmarks.

Example Embodiments

Example 1 includes a vision based navigation system, the system comprising an inertial measurement unit configured to provide inertial measurements for a vehicle; at least one image sensor configured to acquire measurements of the environment of the vehicle; one or more processing units configured to calculate a navigation solution for the vehicle based on the inertial measurements; identify a plurality of landmarks in the acquired measurements; identify a plurality of usable landmarks from the plurality of landmarks; select a subset of useable landmarks from the plurality of useable landmarks such that the subset of landmarks has a smaller dilution of precision than other possible subsets of landmarks from the plurality of useable landmarks, wherein the dilution of precision is an amplification factor of measurement errors derived from the geometry of the subset of useable landmarks; and calculate an updated navigation solution based on the subset of landmarks.

Example 2 includes the system of Example 1, further comprising a storage medium configured to store the plurality of landmarks.

Example 3 includes the system of any of Examples 1-2, wherein the at least one image sensor acquires three-dimensional measurements of the environment.

Example 4 includes the system of any of Examples 1-3, wherein the at least one image sensor acquires two-dimensional measurements of the environment.

Example 5 includes the system of Examples 4, wherein the processing unit is further configured to calculate landmark position estimates using landmarks stored in a storage medium create three-dimensional measurements for the plurality of landmarks from the landmark position estimates and the two-dimensional measurements.

Example 6 includes the system of any of Examples 1-5, wherein the processing unit is further configured to order landmarks in the subset of landmarks according to the effect of the position of the landmark measurement on the dilution of precision.

Example 7 includes the system of any of Examples 1-6, wherein the number of landmarks in the subset of landmarks is less than a landmark threshold.

Example 8 includes the system of Example 7, wherein the landmark threshold is determined by the number of landmarks for which the processing unit can use to compute corrections for the navigation solution of the vehicle within a time period.

Example 9 includes a method for vision based navigation of a vehicle, the method comprising: calculating a predicted navigation solution for the vehicle from inertial measurements of the motion of the vehicle; acquiring measurements of the environment containing the vehicle; identifying a plurality of landmarks from the acquired measurements; identifying a plurality of useable landmarks from the plurality of landmarks; selecting a subset of useable landmarks from the plurality of useable landmarks, wherein the subset of landmarks has a smaller dilution of precision than other possible subsets of landmarks from the plurality of useable landmarks, wherein the dilution of precision is an amplification factor of measurement errors derived from the geometry of the subset of useable landmarks; and calculating an updated navigation solution based on the subset of landmarks.

Example 10 includes the method of Example 9, further comprising determining whether the acquired measurements are at least one of two-dimensional measurements; and three-dimensional measurements.

Example 11 includes the method of any of Examples 9-10, further comprising calculating landmark position estimates from landmarks stored in a storage medium; creating three-dimensional measurements of the identified plurality of landmarks from the landmark position estimates contained within the navigation solution and the two-dimensional measurements.

Example 12 includes the method of any of Examples 9-11, further comprising ordering landmarks in the subset of landmarks according to the effect of the landmark measurements on the dilution of precision.

Example 13 includes the method of Example 12, further comprising discarding landmarks in the set of landmarks based on the ordering of landmarks.

Example 14 includes the method of any of Examples 9-13, wherein the number of landmarks in the subset of landmarks is less than or equal to a landmark threshold.

Example 15 includes the method of Example 14, further comprising using the plurality of useable landmarks as the subset of landmarks when the number of landmarks in the plurality of useable landmarks is less than or equal to the landmark threshold.

Example 16 includes the method of any of Examples 9-15, wherein a useable landmark in the plurality of useable landmarks is a landmark identified in the acquired measurements that is associated with a previously identified landmark, wherein the previously identified landmark was identified from a previous measurement of the environment that was obtained before the acquired measurement.

Example 17 includes the method of any of Examples 9-16, further comprising determining whether the at least one landmark contains new landmarks; when the at least one landmark fails to contain new landmarks, computing corrections for the navigation solution using a previously identified set of landmarks.

Example 18 includes a system for correcting inertial measurements, the system comprising at least one image sensor configured to acquire measurements of an environment; a processing unit configured to extract a plurality of landmarks from the acquired measurements; identify a plurality of useable landmarks in the plurality of landmarks, wherein a useable landmark is a landmark identified in the acquired measurements that is associated with a previously identified landmark, wherein the previously identified landmark was identified in a previous measurement of the environment; identify a subset of landmarks from the plurality of useable landmarks, where the number of landmarks in the subset of landmarks is less than a landmark threshold and the subset of landmarks has a smaller dilution of precision than other possible subsets of landmarks from the plurality of useable landmarks, wherein the dilution of precision is an amplification factor of measurement errors derived from the geometry of the subset of useable landmarks; and calculate corrections to a navigation solution calculated based on the inertial measurements.

Example 19 includes the system of Example 18, wherein the processing unit is further configured to order landmarks in the subset of landmarks according to the effect of the position of the landmark on the dilution of precision.

Example 20 includes the system of any of Examples 18-19, wherein the number of landmarks in the subset of landmarks is less than a landmark threshold, wherein the landmark threshold is determined by the number of landmarks for which the processing unit can use to compute corrections for the position estimate of the vehicle within a time period.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A vision based navigation system, the system comprising:
    an inertial measurement unit configured to provide inertial measurements for a vehicle;
    at least one image sensor configured to acquire measurements of the environment of the vehicle;
    one or more processing units configured to:
        calculate a navigation solution for the vehicle based on the inertial measurements;
        identify a plurality of landmarks in the acquired measurements;
        identify a plurality of usable landmarks from the plurality of landmarks;
        select a subset of useable landmarks from the plurality of useable landmarks such that the subset of landmarks has a smaller dilution of precision than other possible subsets of landmarks from the plurality of useable landmarks, wherein the dilution of precision is a scalar amplification factor of measurement errors that are calculated based on a geometry matrix of the subset of useable landmarks, wherein the geometry matrix includes information about the position of the subset of useable landmarks relative to the vehicle; and
        calculate an updated navigation solution based on the subset of landmarks.

2. The system of claim 1, further comprising a non-transitory storage medium configured to store the plurality of landmarks.

3. The system of claim 1, wherein the at least one image sensor acquires three-dimensional measurements of the environment.

4. The system of claim 1, wherein the at least one image sensor acquires two-dimensional measurements of the environment.

5. The system of claim 4, wherein the processing unit is further configured to:
    calculate landmark position estimates using landmarks stored in a storage medium
    create three-dimensional measurements for the plurality of landmarks from the landmark position estimates and the two-dimensional measurements.

6. The system of claim 1, wherein the processing unit is further configured to order landmarks in the subset of landmarks according to the effect of the position of the landmark measurement on the dilution of precision.

7. The system of claim 1, wherein the number of landmarks in the subset of landmarks is less than a landmark threshold.

8. The system of claim 7, wherein the landmark threshold is determined by the number of landmarks for which the processing unit can use to compute corrections for the navigation solution of the vehicle within a time period.

9. A method for vision based navigation of a vehicle, the method comprising:
- calculating a predicted navigation solution for the vehicle, with one or more processing units, from inertial measurements of the motion of the vehicle;
- acquiring measurements of the environment containing the vehicle;
- identifying a plurality of landmarks from the acquired measurements;
- identifying a plurality of useable landmarks from the plurality of landmarks;
- selecting a subset of useable landmarks from the plurality of useable landmarks, wherein the subset of landmarks has a smaller dilution of precision than other possible subsets of landmarks from the plurality of useable landmarks, wherein the dilution of precision is a scalar amplification factor of measurement errors that are calculated based on a-geometry matrix of the subset of useable landmarks, wherein the geometry matrix includes information about the position of the subset of useable landmarks relative to the vehicle; and
- calculating an updated navigation solution based on the subset of landmarks.

10. The method of claim 9, further comprising determining whether the acquired measurements are at least one of:
- two-dimensional measurements; and
- three-dimensional measurements.

11. The method of claim 9, further comprising:
- calculating landmark position estimates from landmarks stored in a non-transitory storage medium;
- creating three-dimensional measurements of the identified plurality of landmarks from the landmark position estimates contained within the navigation solution and the two-dimensional measurements.

12. The method of claim 9, further comprising ordering landmarks in the subset of landmarks according to the effect of the landmark measurements on the dilution of precision.

13. The method of claim 12, further comprising discarding landmarks in the set of landmarks based on the ordering of landmarks.

14. The method of claim 9, wherein the number of landmarks in the subset of landmarks is less than or equal to a landmark threshold.

15. The method of claim 14, further comprising using the plurality of useable landmarks as the subset of landmarks when the number of landmarks in the plurality of useable landmarks is less than or equal to the landmark threshold.

16. The method of claim 9, wherein a useable landmark in the plurality of useable landmarks is a landmark identified in the acquired measurements that is associated with a previously identified landmark, wherein the previously identified landmark was identified from a previous measurement of the environment that was obtained before the acquired measurement.

17. The method of claim 9, further comprising:
- determining whether the at least one landmark contains new landmarks;
- when the at least one landmark fails to contain new landmarks, computing corrections for the navigation solution using a previously identified set of landmarks.

18. A system for correcting inertial measurements, the system comprising:
- at least one image sensor configured to acquire measurements of an environment;
- a processing unit configured to:
  - extract a plurality of landmarks from the acquired measurements;
  - identify a plurality of useable landmarks in the plurality of landmarks, wherein a useable landmark is a landmark identified in the acquired measurements that is associated with a previously identified landmark, wherein the previously identified landmark was identified in a previous measurement of the environment;
  - identify a subset of landmarks from the plurality of useable landmarks, where the number of landmarks in the subset of landmarks is less than a landmark threshold and the subset of landmarks has a smaller dilution of precision than other possible subsets of landmarks from the plurality of useable landmarks, wherein the dilution of precision is a scalar amplification factor of measurement errors that are calculated based on a-geometry matrix of the subset of useable landmarks, wherein the geometry matrix includes information about the position of the subset of useable landmarks relative to the vehicle; and
  - calculate corrections to a navigation solution calculated based on the inertial measurements.

19. The system of claim 18, wherein the processing unit is further configured to order landmarks in the subset of landmarks according to the effect of the position of the landmark on the dilution of precision.

20. The system of claim 18, wherein the number of landmarks in the subset of landmarks is less than a landmark threshold, wherein the landmark threshold is determined by the number of landmarks for which the processing unit can use to compute corrections for the position estimate of the vehicle within a time period.

* * * * *